(12) United States Patent
Diehl et al.

(10) Patent No.: US 8,691,111 B2
(45) Date of Patent: Apr. 8, 2014

(54) TETRAOXYBIPHENYL ESTER CHIRAL DOPANTS FOR CHOLESTERIC LIQUID CRYSTAL DISPLAYS

(75) Inventors: Donald R. Diehl, Rochester, NY (US); Thomas Welter, Webster, NY (US); Erica N. Montbach, Kent, OH (US); J. William Doane, Kent, OH (US); Nithya Venkataraman, Kent, OH (US)

(73) Assignee: Kent Displays Inc., Kent, OH (US)

( * ) Notice: Subject to any disclaimer, the term of this patent is extended or adjusted under 35 U.S.C. 154(b) by 52 days.

(21) Appl. No.: 13/456,622

(22) Filed: Apr. 26, 2012

(65) Prior Publication Data
US 2012/0273725 A1  Nov. 1, 2012

Related U.S. Application Data

(60) Provisional application No. 61/479,573, filed on Apr. 27, 2011.

(51) Int. Cl.
| | |
|---|---|
| C09K 19/34 | (2006.01) |
| C09K 19/52 | (2006.01) |
| C09K 19/06 | (2006.01) |
| C09K 19/32 | (2006.01) |
| C09K 19/20 | (2006.01) |
| C09K 19/00 | (2006.01) |
| C07D 321/00 | (2006.01) |
| C07D 493/00 | (2006.01) |
| C07D 313/00 | (2006.01) |
| C07D 323/00 | (2006.01) |

(52) U.S. Cl.
USPC ............. 252/299.6; 252/299.61; 252/299.62; 252/299.67; 252/299.01; 428/1.1; 428/1.3; 549/200; 549/267; 549/348

(58) Field of Classification Search
USPC ............... 252/299.01, 299.6, 299.61, 299.62, 252/299.67; 428/1.1, 1.3; 549/200, 267, 549/348
See application file for complete search history.

(56) References Cited

U.S. PATENT DOCUMENTS

| | | | |
|---|---|---|---|
| 4,826,620 | A | 5/1989 | Heppke et al. |
| 5,411,676 | A | 5/1995 | Kelly et al. |
| 6,020,452 | A | 2/2000 | Pu et al. |
| 2004/0007691 | A1 | 1/2004 | Motoyama et al. |
| 2005/0127327 | A1 | 6/2005 | Welter |
| 2005/0250951 | A1 | 11/2005 | Peschko et al. |
| 2008/0090026 | A1 | 4/2008 | Bernatz et al. |

FOREIGN PATENT DOCUMENTS

EP   1911828   4/2008

OTHER PUBLICATIONS

International Search Report and Written Opinion for International Application No. PCT/US2012/035149, Dated Nov. 28, 2012.
Gottarelli, et al., "Induced Cholesteric Mesophases: Origin and Application", Mol. Cryst. Liq. Crys. (1985), vol. 123, pp. 377-388.
Eelkema, et al., "Amplification of chirality in liquid crystals", Org. Biomol. Chem. (2006), 4, 3729-3745.
Holzwarth, et al., "New 2,2'-Substituted 4,4'-Dimethoxy-6,6'-dimethyl[1,1'-biphenyls], Inducing a Strong Helical Twisting Power in Liquid Crystals", Chem. Eur. J. (2004), 10, 3931-3935.
Holzwarth, et al., "New 2,2'-Substituted 6,6'-Dimethylbiphenyl Derivatives Inducing Strong Helical Twisting Power in Liquid Crystals", Eur. J. Org. Chem. (2005), 3536-3541.
Wilson, et al., "Calculating the helical twisting power of chiral dopants", J. Mater. Chem., (2001), 11, 2672-2677.
Chiang, et al., "Electro-rheological behavior of liquid crystal polymers (LCPs) dissolved in a nematic solvent: dependence on temperature and LCP structure", Polymer 41 (2000), 4127-4135.
Tong, et al., "New Bilaterally Linked Mesogens in Main-Chain Polymers with Exhibition of Biaxial Fluctuation in Nematic Phase", Macromolecules (1998), 31(11), 3537-3541.
Wu, et al., "Synthesis and Lyotropic Behavior of Mesogen-Linked Cellulose Acetates", Journal of Applied Polymer Science (2004), vol. 92, 2693-2697.

(Continued)

Primary Examiner — Geraldina Visconti
(74) Attorney, Agent, or Firm — Pearne & Gordon LLP

(57) ABSTRACT

A liquid crystal composition comprising a chiral dopant compound represented by the following formula:

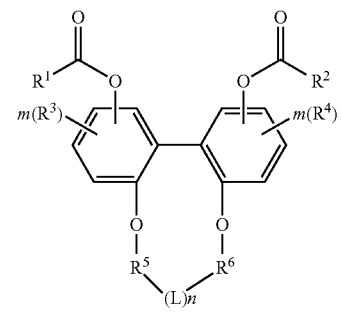

wherein:
R1, R2 are independently aryl, alkyl, alkenyl, cycloalkyl, alkoxyaryl, alkaryl or heterocyclic all either substituted or unsubstituted, or combine to form a carbocyclic or heterocyclic ring;
R3 and R4 are independently hydrogen, halogen, cyano, alkoxy, NHCOR7, NHSO2R7, COOR7, OCOR7, aryl, alkyl, alkenyl, cycloalkyl, alkoxyaryl, alkaryl or heterocyclic all either substituted or unsubstituted, or combine with either R1 or R2 to form a carbocylic or heterocyclic ring;
R5 and R6 are independently hydrogen, CH2, CH, alkyl or aryl either substituted or unsubstituted, COOR7, or combine with L to form a carbocyclic or heterocyclic ring;
R7 is aryl, alkyl, alkenyl, cycloalkyl, alkoxyaryl or heterocyclic all either substituted or unsubstituted;
L is the non-metallic elements required to form a carbocyclic or heterocyclic ring, or a single bond or a double bond;
m is 1-3;
n is 0-12.

37 Claims, 3 Drawing Sheets

(56) References Cited

OTHER PUBLICATIONS

Sartori, et al., "Regiochemical Contro in the oxidative Coupling of Metal Phenolates: Highly Selective Synthesis of Symmetric, Hydroxylated Biaryls", Tetrahedron Letters (1992), vol. 33, No. 16, 2207-2210.

Harada, et al., Asymmetric Desymmetrization of 2,2', 6,6'-Tetrahydroxybiphenyl through Annulation with Enantiomerically Pure Bis(mesylate), Organic Letters (2000), vol. 2, No. 17, 1319-1322.

Harada, et al., "General Method for Asymmetric Synthesis of Substituted 2,2'-Biaryldiols via Asymmertric Desymmertrization of 2,2', 6,6'-Tetrahydroxybiphenyl with I-Menthone", Tetrahedron (1997), vol. 53, No. 49, 16663-16678.

Spada, et al., "The Nematic Liquid Crystal Phase as a Probe of the Molecular Shape Helicity", Enantiomer (1998), vol. 3, 301-314.

Kalyvas, et al., "Thermotropic Liquid Crystal Behavior in Some Aromatic Esteramides", Mol. Cryst. liq. Cryst. (1982), vol. 80, 105-118.

Currie, et al. "A New Method for the Synthesis of Depsides", Physicochemical Studies of Complex Acids, J. Chem. Soc. (1932) 2263-2265.

Yamaguchi, et al., Ba-Catalyzed Direct Mannich-Type Reactions of a B,y-Unsaturated Ester Providing B-Methyl aza-Morita-Baylis-Hillman-Type Products, Organic Letters (2007) vol. 9, No. 17, 3387-3390.

Delogu, et al., "Two new efficient preparations of enantiopure 2,2'-dihydroxy-6,6'-dimethoxy-1,1'-biphenyl", Tretrahedron: Asymmetry (1997), vol. 8, No. 5, 759-763.

Henderson, et al., "Antiferroelectric Liquid Crystals Containing a Naphthoate Mesogenic Unit", Ferroelectrics (2006), 343:1, 11-18.

Tong, et al., "New Bilaterally Linked Mesogens in Main-Chain Polymers with Exhibition of Biaxial Fluctuation in Nematic Phase", Polymer Preprints (1998), 39 (1), 252-253.

TETRAOXYBIPHENYL ESTER CHIRAL DOPANTS FOR CHOLESTERIC LIQUID CRYSTAL DISPLAYS

TECHNICAL BACKGROUND

Chiral nematic, also known as cholesteric, liquid crystalline materials are useful in cholesteric liquid crystal displays a variety of applications including various liquid crystal (e.g.: LC) display components, reflective films, optical filters, polarizers, paints, and inks, among others. Methods for preparing such materials are well established. See for example: G. Gottarelli and G. Spada, *Mol. Cryst. Liq. Crys.*, 123, 377 (1985); G. Spada and G. Proni, *Enantiomer*, 3, 301 (1998). However, improvement is still needed. While early uses of chiral nematic compositions relied upon mixtures composed mostly of chiral components, more recently such materials are composed of nematic liquid crystal (LC) mixtures combined with small amounts of chiral dopants. In such new compositions the properties of the nematic host material, for example: viscosity, birefringence, electrical anisotropy, and magnetic anisotropy among others, are tailored to the desired usage by altering the chemical composition of the nematic mixture and then a chiral dopant is incorporated to induce helical twisting so as to provide the desired chiral nematic pitch. It is apparent that the properties of this chiral nematic composition are therefore a combination of the properties of the nematic host plus those of the dopant.

Chiral nematic liquid crystals can be formulated to reflect various wavelength of incident electromagnetic radiation, and it is well understood that the reflected light is circularly polarized, depending upon the sense of chirality of the helical pitch. Thus a chiral nematic displaying a right-handed helical meso-structure will reflect right-handed incident light. For many applications it is useful to be able to reflect both right-handed and left-handed sense of circularly polarized light, for example, in a vertically layered structure. It is further well known that enantiomers of a chiral dopant structure induce the opposite polarity of helical rotation and, therefore, afford oppositely polarized light reflections. For this reason the preparation of enantiomeric dopants for use in separate light modulating layers can be particularly useful.

For some applications it is desirable to have liquid crystal mixtures that exhibit a strong helical twist and thus a short pitch length. A short pitch can be achieved by using high amounts of dopant or by using a dopant with a high helical twisting power. However, using chiral dopants in high amounts can negatively affect the properties of the liquid crystalline host mixture, for example; the dielectric anisotropy, the viscosity, and the driving voltage or the switching times among others. In liquid crystalline mixtures that are used in selectively reflecting cholesteric displays, the pitch has to be selected such that the maximum of the wavelength reflected by the cholesteric helix is in the range of visible light. Another possible application is polymer films with a chiral liquid crystalline phase for optical elements, such as cholesteric broadband polarizers or chiral liquid crystalline retardation films.

Such liquid crystalline materials can be used for the preparation of polymer films with a chiral liquid crystalline phase, for active and passive optical elements or color filters and for liquid crystal displays, for example STN, TN, AMD-TN, temperature compensation, guest-host or phase change displays, or polymer free or polymer stabilized cholesteric texture (PFCT, PSCT) displays. Such liquid crystal displays can include a chiral dopant in a liquid crystalline medium and a polymer film with a chiral liquid crystalline phase obtainable by (co)polymerizing a liquid crystalline material containing a chiral dopant and a polymerizable mesogenic compound.

Biphenyl chiral dopants with 4,4' substitution have been long known and well studied, and are reported to display generally small helical twisting power when they are used as dopants in nematic liquid crystals. See for example the review: R. Eelkema and B. L. Feringa, *Org. Biomol. Chem.*, 2006, 4, 3729-3745. However, biphenyl chiral dopants with 2,2' substitution have received much less study. The 2,2'-dimethylbiphenyl derivatives described by R. Holzwarth, R. Bartsch, Z. Cherkaoui, and G. Solladie in *Eur. J. Org. Chem.* 2005, 3536-3541, and *Chem. Eur. J.* 2004, 10, 3931-3935, and by M. R. Wilson and D. J. Earl in *J. Mater. Chem.*, 2001, 11, 2672-2677 are reported to show small to moderate helical twisting powers. Biphenyl liquid crystalline materials with multiple oxygen linked substituents have been reported in studies of liquid crystalline polymers. See polymers described by T.-H.-Tong, et. al., in *Polymer* (2000), 41(11), 4127-4135, *Macromolecules* (1998), 31(11), 3537-3541, and *Polymer Preprints* (1998), 39(1), 252-253. Also, binaphthyl materials with multiple oxygen linked substituents have been reported for polymer preparations by G. Bernatz and A. Taugerbeck in European Patent Application EP1911828 A1 20080416.

Thus there is a considerable demand for new chiral dopants with a high helical twisting power which can be easily synthesized in individual enantiomers, which can be used in low amounts, show improved temperature stability of the cholesteric pitch for utilizing a temperature invariant reflection wavelength and do not affect the properties of the liquid crystal host mixture.

We have found new inventive chiral dopants of the tetraoxybiphenyl esters which provide these properties, can be prepared easily, have high helical twisting power, and do not have the disadvantages of the dopants of the state of the art as discussed above.

BRIEF DESCRIPTION

A first aspect of the invention features a liquid crystal composition comprising a chiral dopant compound represented by the following formula:

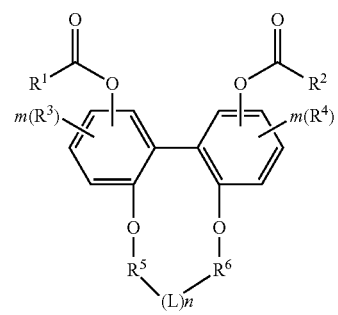

wherein:

R1, R2 are independently aryl, alkyl, alkenyl, cycloalkyl, alkoxyaryl, alkaryl or heterocyclic all either substituted or unsubstituted, or combine to form a carbocyclic or heterocyclic ring;

R3 and R4 are independently hydrogen, halogen, cyano, alkoxy, NHCOR7, NHSO2R7, COOR7, OCOR7, aryl, alkyl, alkenyl, cycloalkyl, alkoxyaryl, alkaryl or heterocyclic all either substituted or unsubstituted, or combine with either R1 or R2 to form a carbocyclic or heterocyclic ring;

R5 and R6 are independently hydrogen, CH2, CH, alkyl or aryl either substituted or unsubstituted, COOR7, or combine with L to form a carbocyclic or heterocyclic ring;

R7 is aryl, alkyl, alkenyl, cycloalkyl, alkoxyaryl or heterocyclic all either substituted or unsubstituted;

L is the non-metallic elements required to form a carbocyclic or heterocyclic ring, or a single bond or a double bond;

m is 1-3;

n is 1-12.

A second aspect of the invention features a liquid crystal composition comprising a chiral dopant compound represented by the following formula:

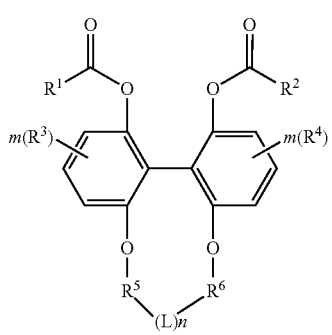

wherein:

R1, R2 are independently aryl, alkyl, alkenyl, cycloalkyl, alkoxyaryl, alkaryl or heterocyclic all either substituted or unsubstituted, or combine to form a carbocyclic or heterocyclic ring;

R3 and R4 are independently hydrogen, halogen, cyano, alkoxy, NHCOR7, NHSO2R7, COOR7, OCOR7, aryl, alkyl, alkenyl, cycloalkyl, alkoxyaryl, alkaryl or heterocyclic all either substituted or unsubstituted, or combine with either R1 or R2 to form a carbocyclic or heterocyclic ring;

R5 and R6 are independently hydrogen, CH2, CH, alkyl or aryl either substituted or unsubstituted, COOR7, or combine with L to form a carbocyclic or heterocyclic ring;

R7 is aryl, alkyl, alkenyl, cycloalkyl, alkoxyaryl or heterocyclic all either substituted or unsubstituted;

L is the non-metallic elements required to form a carbocyclic or heterocyclic ring, or a single bond or a double bond;

m is 1-3;

n is 0-12.

A third aspect of the invention features a liquid crystal composition comprising a chiral dopant compound represented by the following formula:

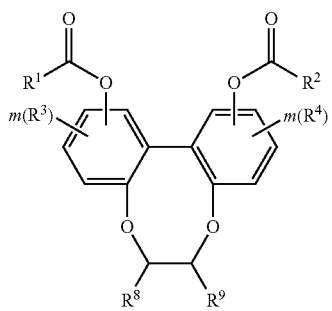

wherein:

R1, R2 are independently aryl, alkyl, alkenyl, cycloalkyl, alkoxyaryl, alkaryl or heterocyclic all either substituted or unsubstituted, or combine to form a carbocyclic or heterocyclic ring;

R3 and R4 are independently hydrogen, halogen, cyano, alkoxy, NHCOR7, NHSO2R7, COOR7, OCOR7, aryl, alkyl, alkenyl, cycloalkyl, alkoxyaryl, alkaryl or heterocyclic all either substituted or unsubstituted, or combine with either R1 or R2 to form a carbocyclic or heterocyclic ring;

R8 and R9 are independently hydrogen, CH2, CH, alkyl or aryl either substituted or unsubstituted, COOR7, or combine to form a carbocyclic or heterocyclic ring;

R7 is aryl, alkyl, alkenyl, cycloalkyl, alkoxyaryl or heterocyclic all either substituted or unsubstituted;

m is 1-3.

A fourth aspect of the invention features a liquid crystal composition comprising a chiral dopant compound represented by the following formula:

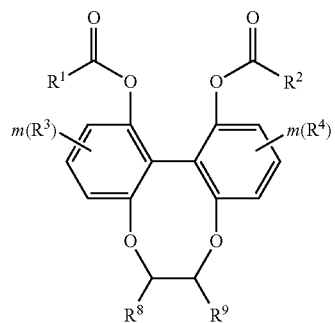

wherein:

R1, R2 are independently aryl, alkyl, alkenyl, cycloalkyl, alkoxyaryl, alkaryl or heterocyclic all either substituted or unsubstituted, or combine to form a carbocyclic or heterocyclic ring;

R3 and R4 are independently hydrogen, halogen, cyano, alkoxy, NHCOR7, NHSO2R7, COOR7, OCOR7, aryl, alkyl, alkenyl, cycloalkyl, alkoxyaryl, alkaryl or heterocyclic all either substituted or unsubstituted, or combine with either R1 or R2 to form a carbocyclic or heterocyclic ring;

R8 and R9 are independently hydrogen, CH2, CH, alkyl or aryl either substituted or unsubstituted, COOR7, or combine to form a carbocyclic or heterocyclic ring;

R7 is aryl, alkyl, alkenyl, cycloalkyl, alkoxyaryl or heterocyclic all either substituted or unsubstituted;

m is 1-3.

A fifth aspect of the invention features a liquid crystal composition comprising a chiral dopant compound represented by the following formula:

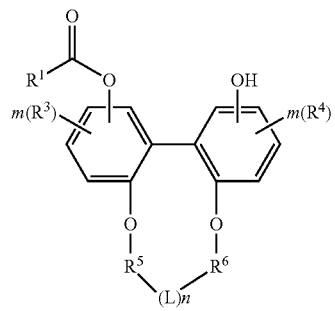

wherein:

R1 is independently aryl, alkyl, alkenyl, cycloalkyl, alkoxyaryl, alkaryl or heterocyclic all either substituted or unsubstituted, or combine to form a carbocyclic or heterocyclic ring;

R3 and R4 are independently hydrogen, halogen, cyano, alkoxy, NHCOR7, NHSO2R7, COOR7, OCOR7, aryl, alkyl, alkenyl, cycloalkyl, alkoxyaryl, alkaryl or heterocyclic all either substituted or unsubstituted, or combine with either R1 or OH to form a carbocyclic or heterocyclic ring;

R5 and R6 are independently hydrogen, CH2, CH, alkyl or aryl either substituted or unsubstituted, COOR7, or combine with L to form a carbocyclic or heterocyclic ring;

R7 is aryl, alkyl, alkenyl, cycloalkyl, alkoxyaryl or heterocyclic all either substituted or unsubstituted;

L is the non-metallic elements required to form a carbocyclic or heterocyclic ring, or a single bond or a double bond;

m is 1-3;

n is 1-12.

Many additional features, advantages and a fuller understanding of the invention will be had from the accompanying drawings and the Detailed Description that follows. It should be understood that the above Brief Description describes the invention in broad terms while the following Detailed Description describes the invention more narrowly and presents specific embodiments that should not be construed as necessary limitations of the broad invention as defined in the claims.

DETAILED DESCRIPTION

Figure 1:
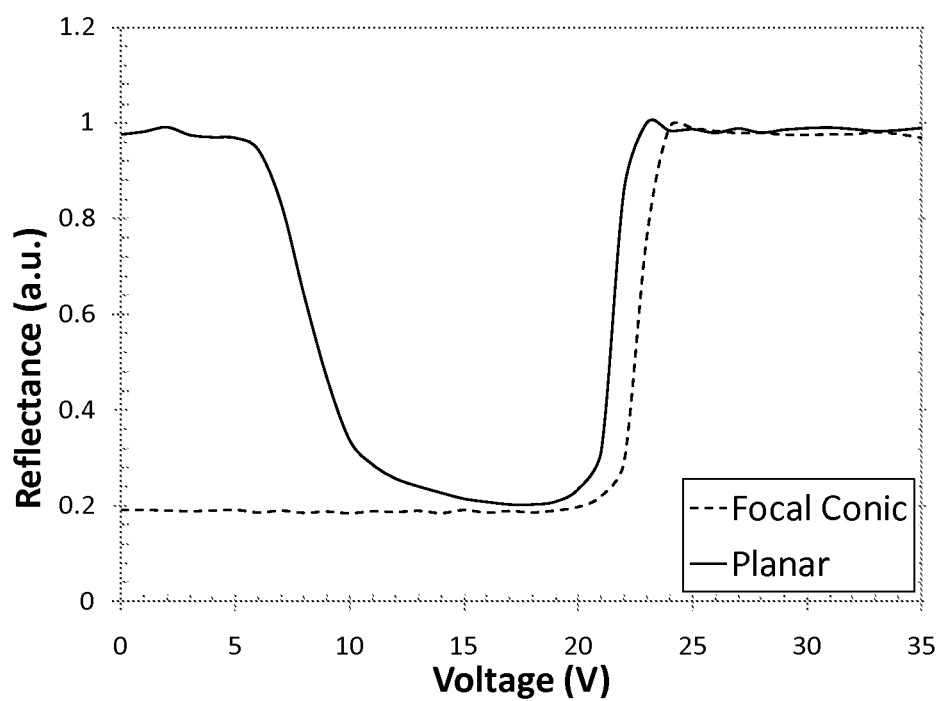
FIG. 1: Electro-optical response for Inv-1 in LC 1 at a pulsewidth of 100 ms at 250 Hz.

We have found that certain tetraoxybiphenyl compounds represented by the following Structural Formula 1 are useful as a source of chiral dopants. In particular, the enantiomerically enriched form of such compounds, including the substantially enantiomerically pure form, introduced into nematic compositions, afford useful chiral nematic mixtures.

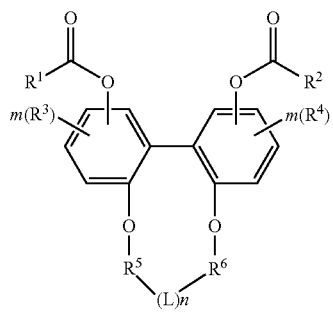

Formula 1

As evident, compounds of Formula 1 comprise two oxygen containing substituents connected at the 2,2' position of the biphenyl nucleus and $R^3$ or $R^4$, and the other pair of oxygen substituents including R1 or R2, may be at the 3,3', 4,4', 5,5' or 6,6' positions respectively. It is understood that the substituents on the biphenyl ring may not necessarily be symmetrically attached as long as one pair of oxygen containing substituents are in the 2,2' positions. In Formula 1, R1, R2 are independently aryl, alkyl, alkenyl, cycloalkyl, alkoxyaryl, alkaryl, biphenyl or heterocyclic all either substituted or unsubstituted, R3 and R4 are independently hydrogen, halogen, cyano, alkoxy, NHCOR7, NHSO2R7, COOR7, OCOR7, aryl, alkyl, alkenyl, cycloalkyl, alkoxyaryl, alkaryl, biphenyl or heterocyclic all either substituted or unsubstituted, or combine with either R1 or R2 to form a carbocyclic or heterocyclic ring, R5 and R6 are independently $CH_2$, CH, alkyl or aryl either substituted or unsubstituted, COOR7, or combine with L to form a carbocyclic or heterocyclic ring, R7 is aryl, alkyl, alkenyl, cycloalkyl, alkoxyaryl or heterocyclic all either substituted or unsubstituted, L is the non-metallic elements required to form a carbocyclic or heterocyclic ring, or a single bond (e.g., a bond between two CH2 groups) or a double bond, m is 1-3, and n is 1-12.

A preferred embodiment are compounds represented by the following Structural Formula 2:

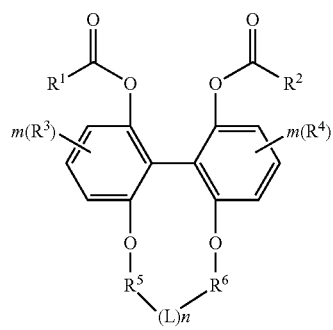

Formula 2 wherein R1, R2, R3, R4, R5, R6, R7, L, m and n are as defined above but two oxygen containing substituents are connected at the 2,2' position of the biphenyl nucleus and another pair of oxygen containing substituents are connected at the 6,6' positions, and n may be 0.

Another embodiment are compounds represented by the following Structural Formula 3:

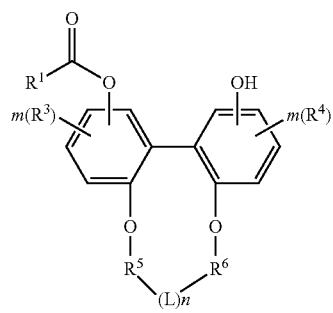

Formula 3 wherein R1, R3, R4, R5, R6, R7, L, m and n are as defined above but one of the oxygen substituents is a hydroxyl substituent. R3 and R4 can combine with either R1 or OH to form a carbocyclic or heterocyclic ring.

A highly preferred embodiment are compounds represented by the following Structural Formula 4:

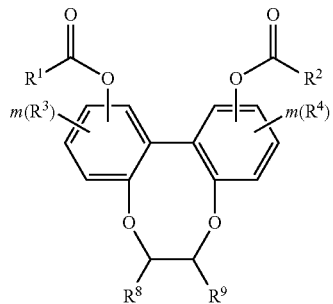

Formula 4 wherein R1, R2, R3, R4, R7, and m are as defined above and two oxygen containing substituents are connected at the 2,2' position of the biphenyl nucleus and another pair of oxygen containing substituents may be connected at the 6,6' positions and R8 or R9 are independently hydrogen, CH2, CH, alkyl or aryl either substituted or unsubstituted, COOR7, or combine to form a carbocyclic or heterocyclic ring.

In general, when reference in this application is made to a particular moiety group it is to be understood that such reference encompasses that moiety whether unsubstituted or substituted with one or more substituents (up to the maximum possible number). For example, "alkyl" or "alkyl group" refers to substituted or unsubstituted alkyl, while "benzene group" refers to a substituted or unsubstituted benzene (with up to six substituents). Generally unless otherwise specifically stated, substituent groups usable on molecules herein include any groups, whether substituted or unsubstituted, which do not destroy properties necessary for mesophase utility. Examples of substituents on any of the mentioned groups can include known substituents, such as: chloro, fluoro, bromo, iodo, hydroxyl, alkoxy, particularly those of "lower alkyl" (that is, with 1 to 12 carbon atoms, for example, methoxy, ethoxy); substituted or unsubstituted alkyl, particularly lower alkyl (for example, methyl, trifluoromethyl); thioalkyl (for example, methylthio or ethylthio), particularly either of those with 1 to 12 carbon atoms; substituted or unsubstituted alkenyl, preferably of 2 to 12 carbon atoms (for example, ethenyl, propenyl, or butenyl); substituted or unsubstituted aryl, particularly those having from 6 to 20 carbon atoms (for example, phenyl); substituted or unsubstituted cycloalkyl, particularly those having from 5 to 20 carbon atoms (for example, cyclopentyl, or cyclohexyl); and substituted or unsubstituted heteroaryl, particularly those having a 5 or 6-membered ring containing 1 to 3 heteroatoms selected from N, O, or S (for example, pyridyl, thienyl, furyl, pyrrolyl); acid or acid salt groups; such groups as hydroxyl, amino, alkylamino, cyano, nitro, carboxy, carboxylate, acyl alkoxycarbonyl, aminocarbonyl, sulfonamide, sulfamoyl, sulfo, sulfonate, or alkylammonium; and other groups known in the art. In particular, alkyl substituents may specifically include "lower alkyl" (that is, having 1-12 carbon atoms), for example, methyl, ethyl, and the like. Further, with regard to any alkyl group or alkylene group, it will be understood that these can be branched or unbranched and include ring structures.

The R1 and R2 group in Formula 1, Formula 2, Formula 3, or Formula 4 is independently any substituent preferably having 1 to 24 carbon atoms, more preferably 8 to 18 carbon atoms. It is preferred to be aryl, alkyl, cycloalkyl, alkaryl, alkoxyaryl, or heterocyclic either substituted or unsubstituted. It is particularly preferred for the R1 and R2 group to contain an aromatic ring, which may be the same or different, for example, a phenyl-containing group. It is most preferred that R1 and R2 be aryl either substituted or unsubstituted as defined by: —R1 or —R2=—(Y—K)$_p$—Z: wherein K is a single bond or double bond, e.g. —(Y)$_p$—Z or bivalent linking chosen from the following groups: —C(=O)O—; —O(C=O)—; —CH2CH2-; —CH=CH—; —C≡C—; —OCH2—; —CH2O—; —N=CH—; —CH=N—; —O(C=O)O—; —C≡C—C≡C—; —COCH=CH—; —CH=CHCO—; —O—; —S—; and SO2; as long as oxygen atoms are not linked directly to one another; wherein Y and Z independently may be 1,4-phenylene in which, in addition, one or more methylene may be replaced by —N=, 1,4-cyclohexyl in which, in addition, one or more non-adjacent methylene units may be replaced by O or S, 1,4-cyclohexylene, 1,4-bicyclo[2.2.2]octylene, piperidine-1,4-diyl, decahydronaphthalene-1,6-diyl, 1,2,3,4-tetrahydronaphthalene-1,6-diyl, in which each of the Y or Z groups may be unsubstituted or mono-substituted or poly-substituted with halogen, cyano, isocyanato, or nitro groups; or alkyl, alkoxyl, or alkanoyl groups bearing 1-12 carbons where one or more hydrogens may be replaced with chlorine or fluorine and wherein p=0, 1, 2, 3, 4. As indicated above, R1 and R2 in Formula 1, Formula 2 and Formula 4 can also be connected to form a bridge between the two phenyl rings. In one preferred embodiment R1 and R2 are substituted aryl.

The R3 and R4 group in Formula 1, Formula 2, Formula 3, or Formula 4 can independently be any substituent. It is preferred to be an oxygen-containing organic substituent and/or a carbon containing substituent. Preferred oxygen-containing substituents include alkoxy, aryloxy, carboalkyl (—C(=O)R), carboaryl (—C(=O)Ar), carboalkoxy (—C(=O)OR), carboaryloxy (—C(=O)OAr) either substituted or unsubstituted. Preferred carbon containing substituents include alkyl groups of about 1-20 carbons, cycloalkyl groups of about 1-20 carbons, aryl groups of about 6-20 carbons, alkaryl groups of about 6-20 carbons, and heterocyclic groups having at least one heteroatom and 2-20 carbons; all either substituted or unsubstituted, as long as oxygen atoms are not linked directly to one another. Other preferred oxygen-containing organic substituents include carboalkoxy (C—C(=O)OR), carboaryloxy (C—C(=O)OAr), aryl or alkyl ketones (C—C(=O)R) or (C—C(=O)Ar), all either substituted or unsubstituted. Other suitable R3 and R4 substitutents include but are not limited to halogens; cyano (—CN); hydroxyl, amino, alkylamino, nitro, carboxy, aminocarbonyl, sulfonamide, sulfamoyl, sulfo, sulfonate, or alkylammonium; as well as siloxane residue or polymerizable groups. In one preferred embodiment R3 and R4 are hydrogen and m is 3.

The R5 and R6 group in Formula 1, Formula 2 or Formula 3 is independently a hydrogen, methylene group (—CH2)-, a substituted or unsubstituted methine group (—CH)—, or carbonyl —(C=O)—, which may be connected to each other or to L to form a carbocyclic ring of about 1-20 carbons or heterocyclic ring having at least one heteroatom and 2-20 carbons; or aryl, alkyl, cycloalkyl, alkaryl, alkoxyaryl, or heterocyclic either substituted or unsubstituted. In one preferred embodiment R5 and R6 are methyl, substituted or unsubstituted aryl, methylene or substituted methine groups. In one highly preferred embodiment R5 and R6 are a methylene group and a substituted methine group.

The L in Formula 1, Formula 2 or Formula 3 can be any bivalent substituent such as methylene, carbonyl (—(C=O)—), disubstituted carbon (R—C—R) wherein R is hydrogen or any substituent, or L may be a single bond or a double bond, or L may be a cycloalkyl groups of about 1-20 carbons, aryl groups of about 6-20 carbons, and heterocyclic groups having at least one heteroatom and 2-20 carbons; all either substituted or unsubstituted, connecting both R5 and R6, as long as oxygen atoms are not linked directly to one another. In one preferred embodiment L is a single bond or a methylene group. In one highly preferred embodiment L is a single bond. The n of Formula 1 is 1 to 12 and the n of Formula 2 or Formula 3 is 0 to 12. In one preferred embodiment the n of Formula 2 is 0 to 6. In one highly preferred embodiment n is 1.

The R8 and R9 group in Formula 4 is independently a hydrogen, methylene group (—CH2)-, a substituted or unsubstituted methine group (—CH)—, or carbonyl —(CO)—, which may be connected to each other to form a carbocyclic ring of about 1-20 carbons or a heterocyclic ring having at least one heteroatom and 2-20 carbons, or aryl, alkyl, cycloalkyl, alkaryl, alkoxyaryl, or heterocyclic either substituted or unsubstituted. In one highly preferred embodiment R8 is hydrogen and R9 is methyl.

Some examples of compounds according to the present invention, which examples are merely illustrative and not intended to be limiting, are as follows:

Inv-1

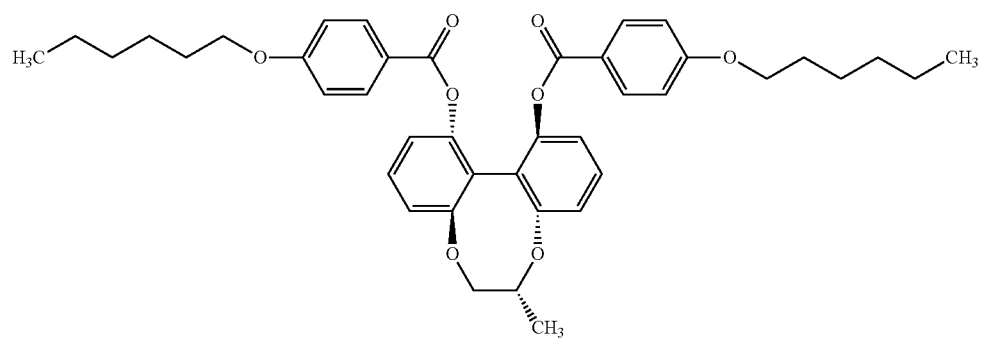

Inv-2

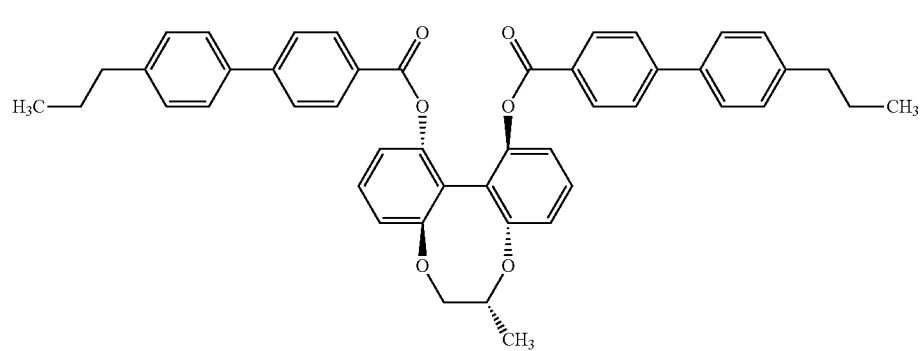

Inv-3

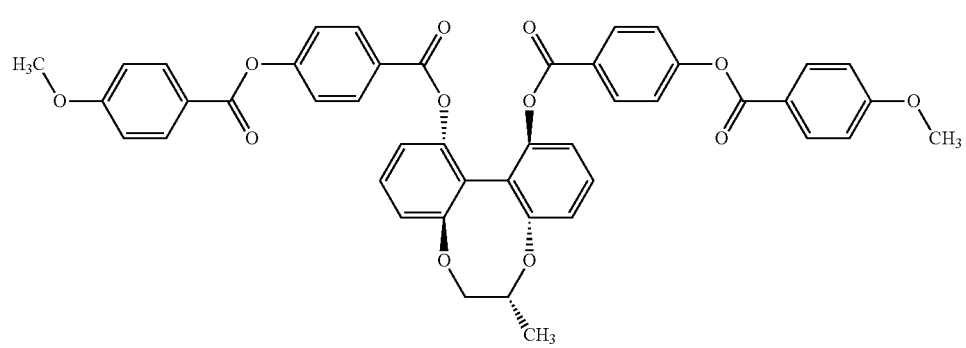

Inv-4
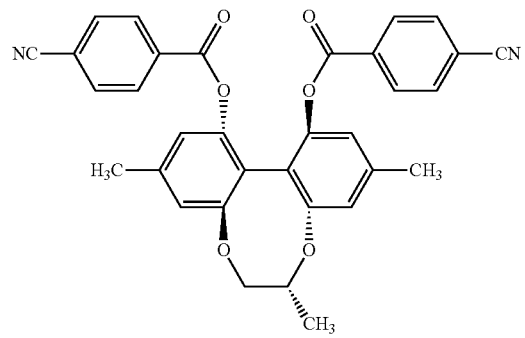
Inv-5
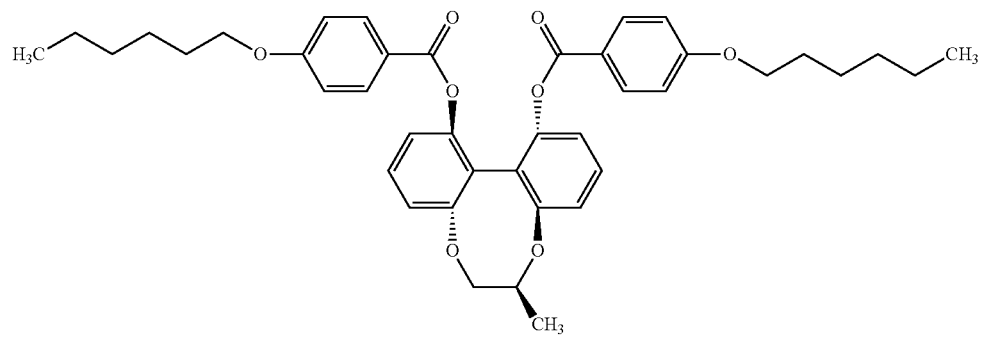
Inv-6
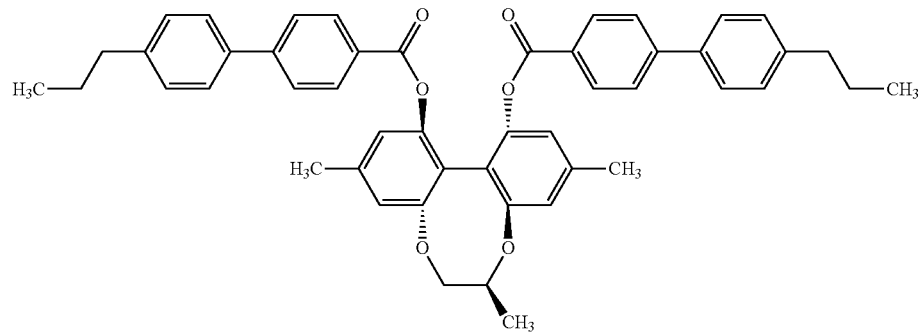
Inv-7
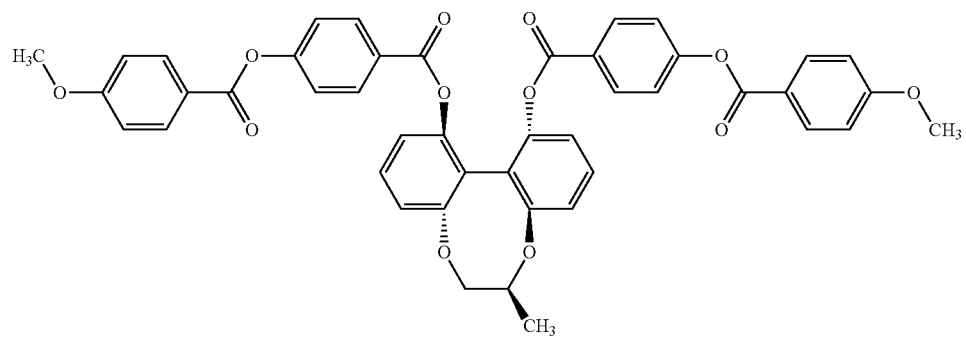

-continued
Inv-8
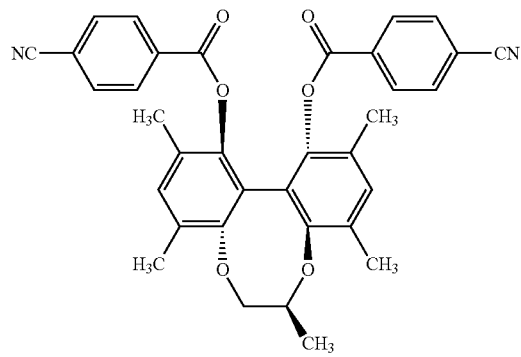
Inv-9
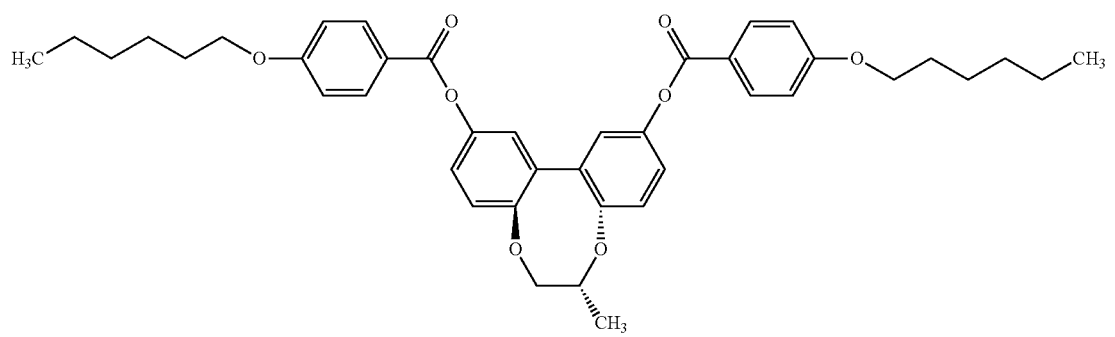
Inv-10
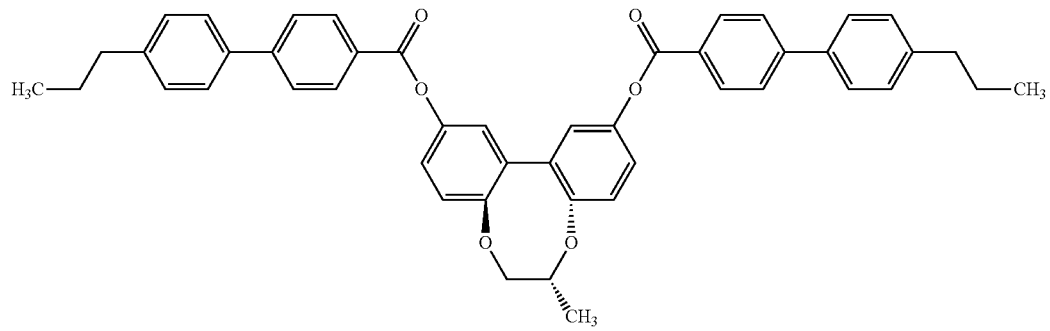
Inv-11
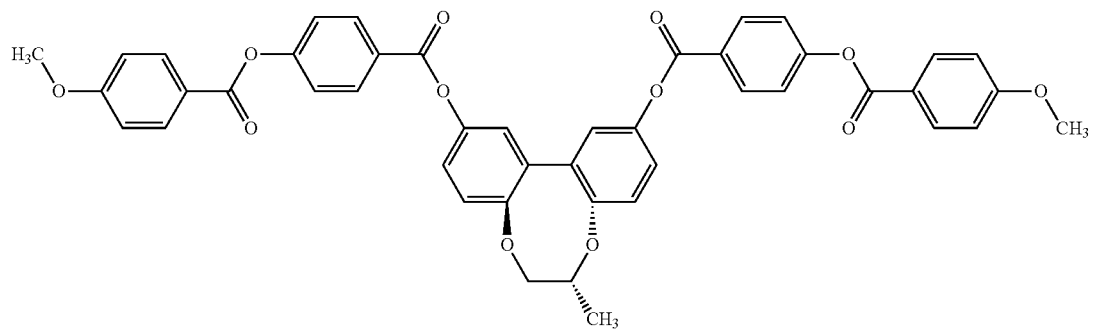
Inv-12
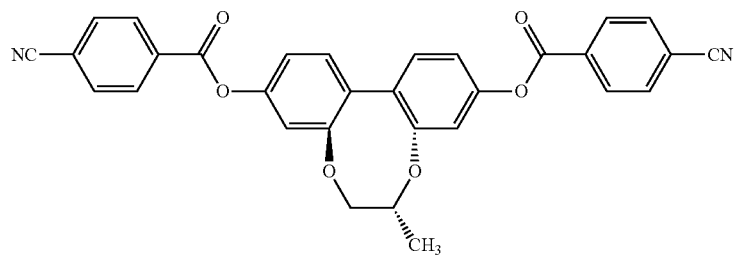

-continued
Inv-13
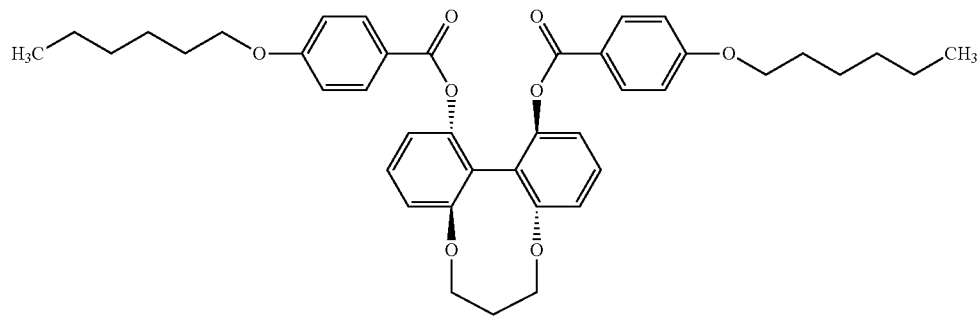
Inv-14
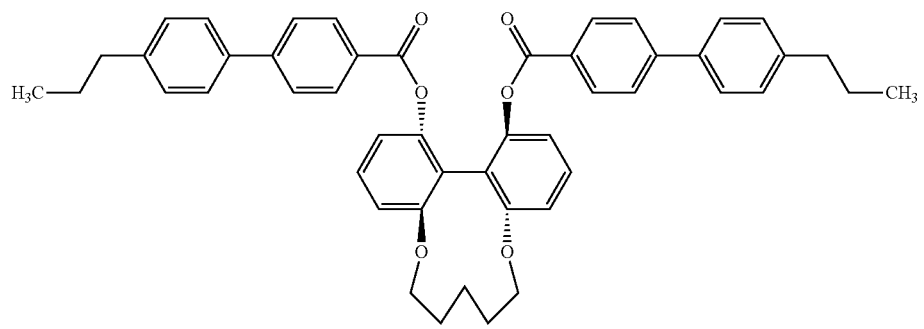
Inv-15
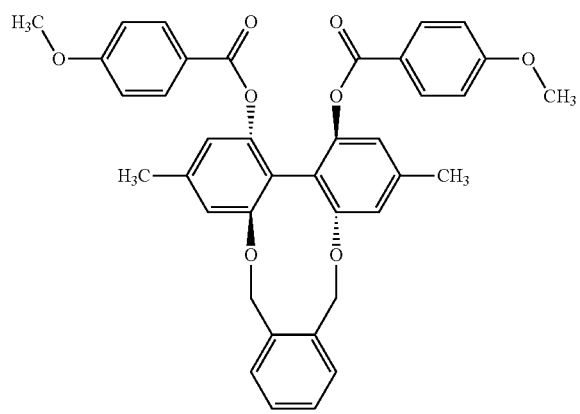
Inv-16
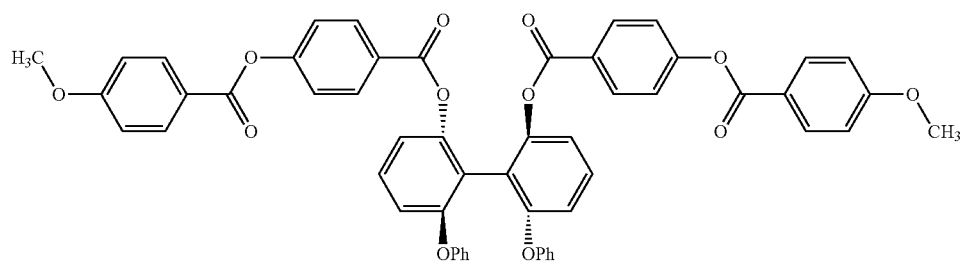
Inv-17
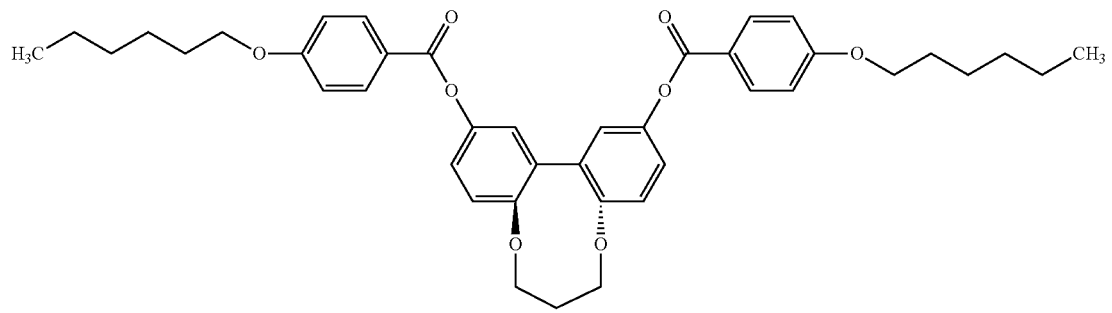

-continued
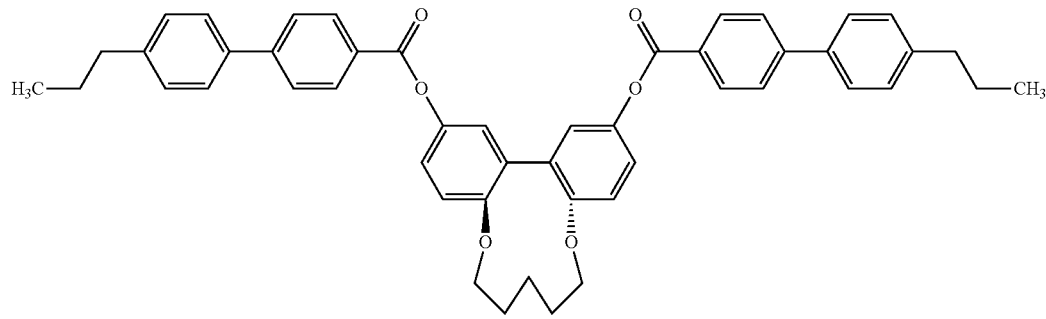
Inv-18
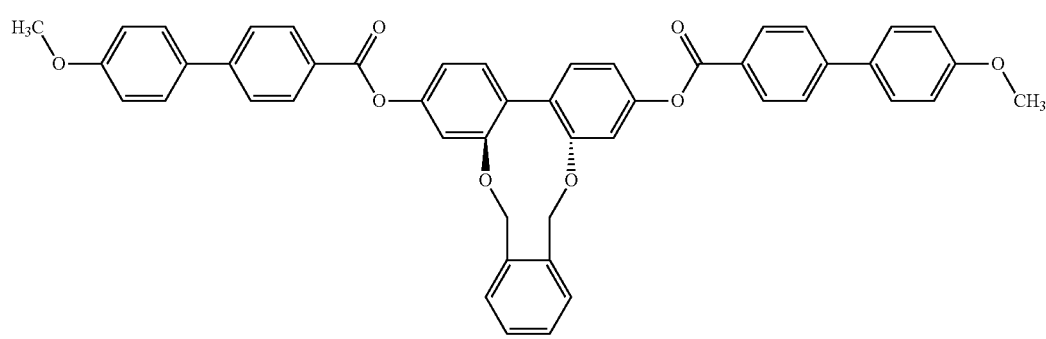
Inv-19
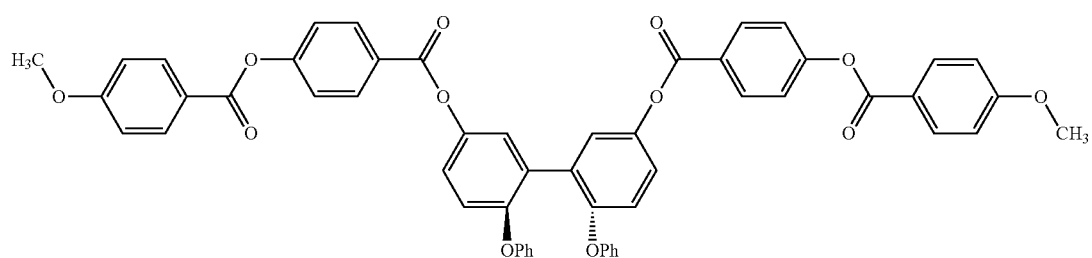
Inv-20
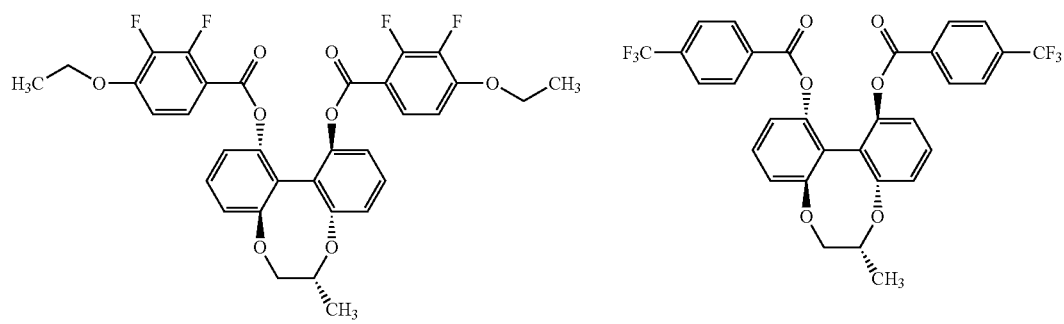
Inv-21                                    Inv-22
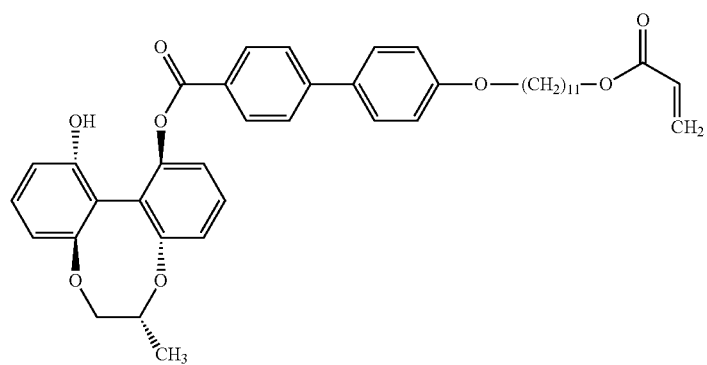
Inv-23

-continued
Inv-24
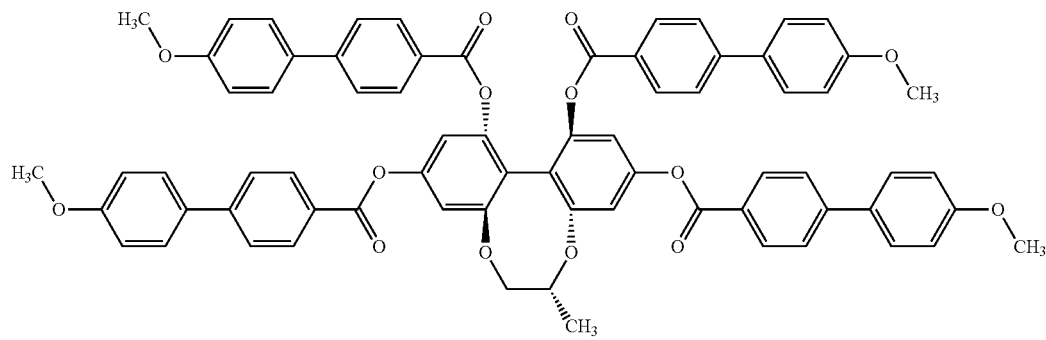
Inv-25
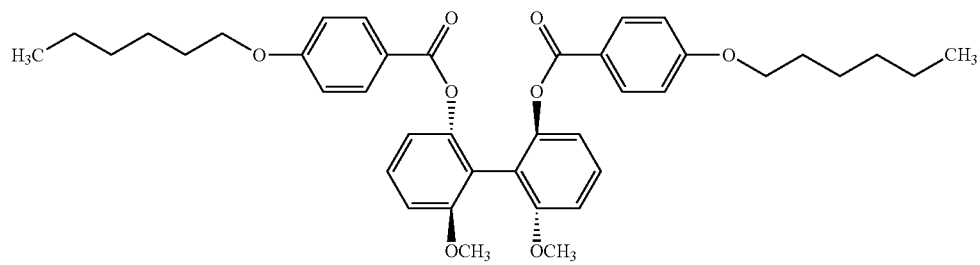
Inv-26
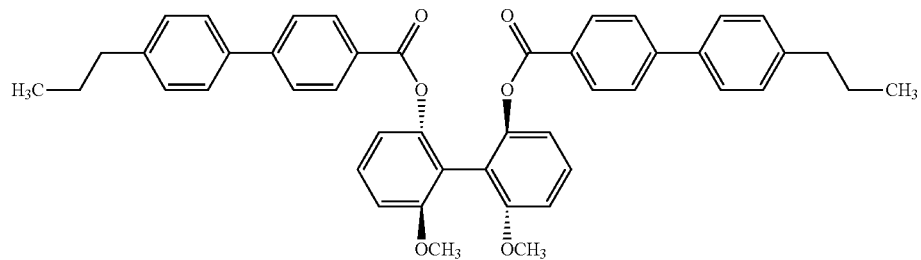
Inv-27
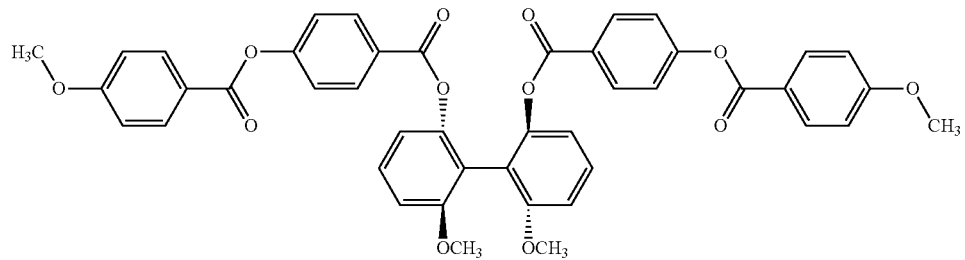
Inv-28
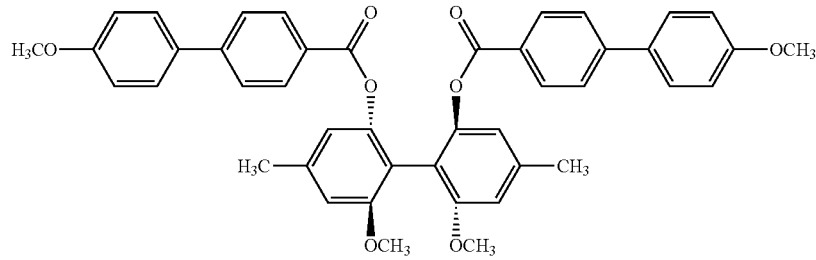

Inv-29
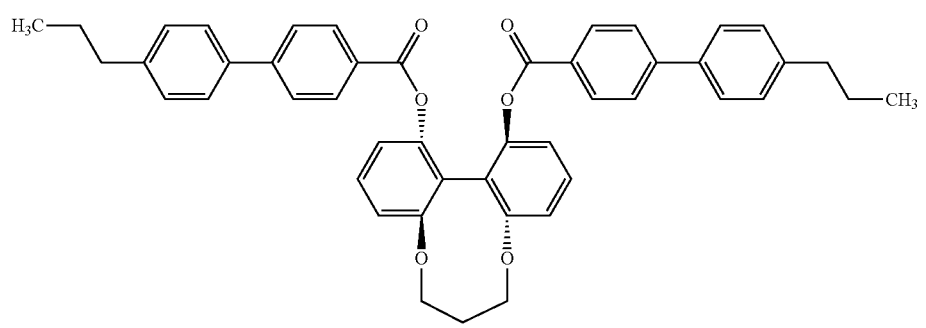
Inv-30
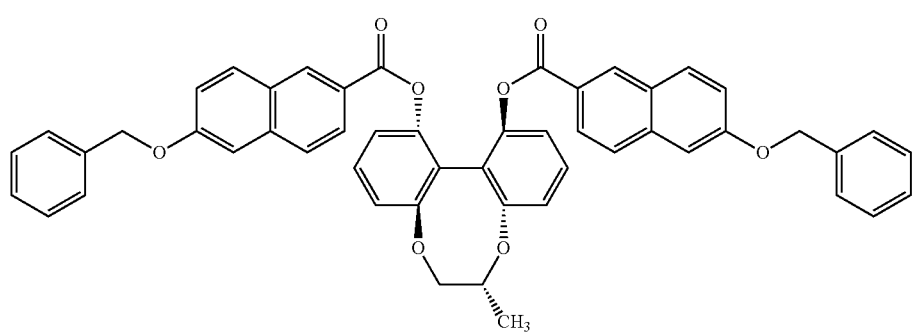
Inv-31
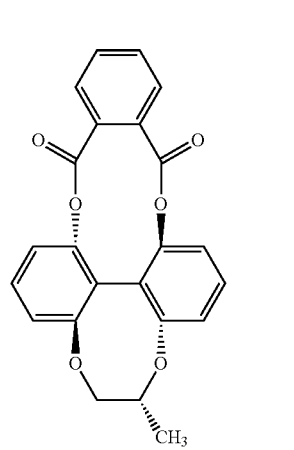
Inv-32
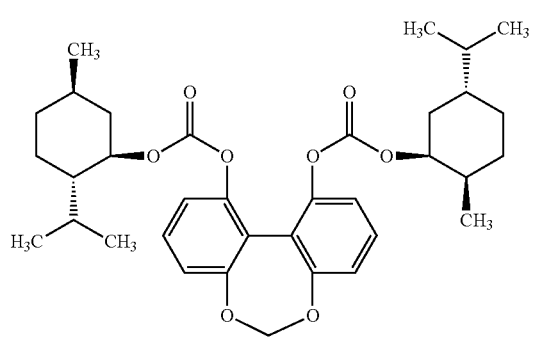
Inv-33
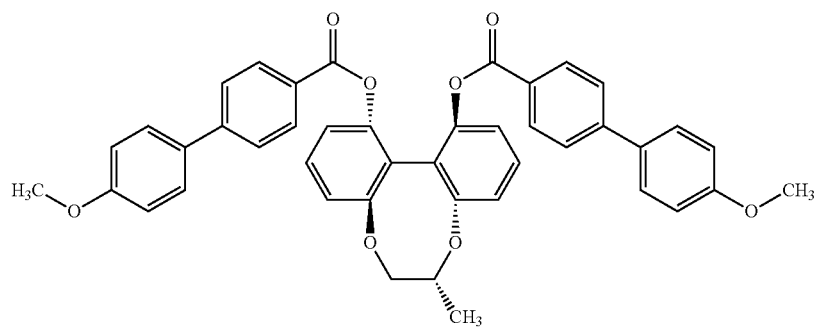

-continued
Inv-34
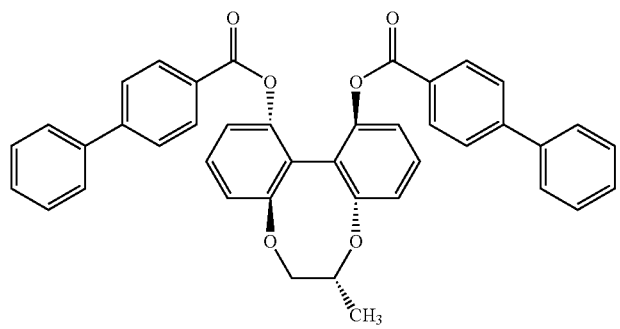
Inv-35
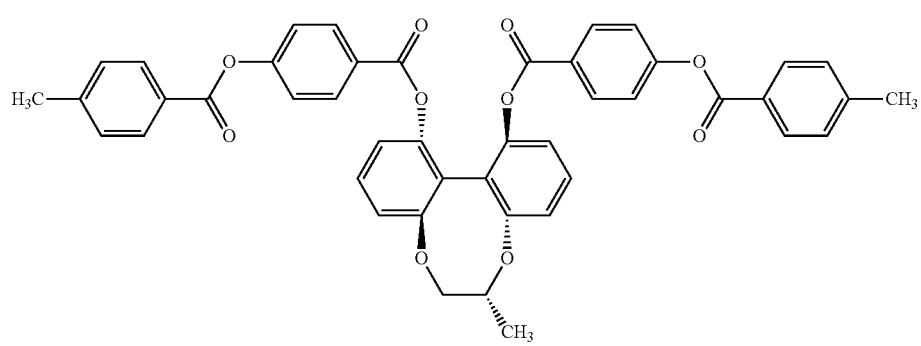
Inv-36
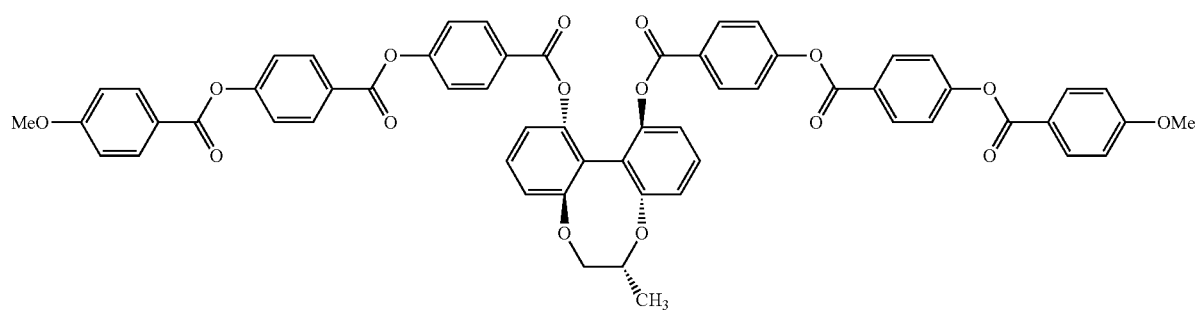
Inv-37
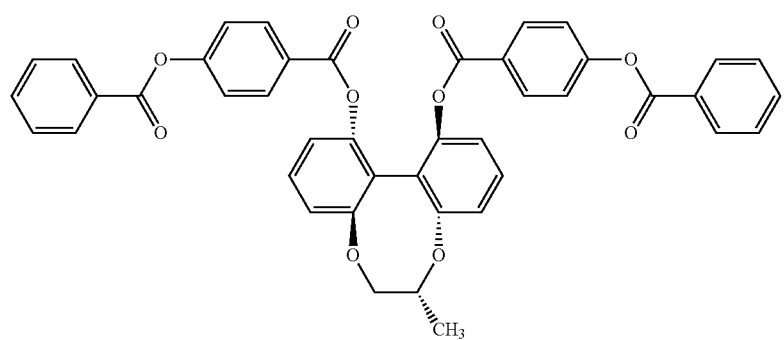

Inv-38

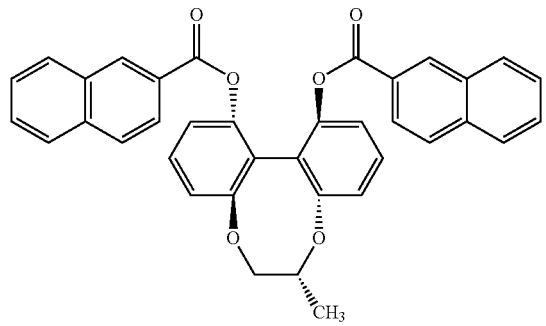

Inv-39

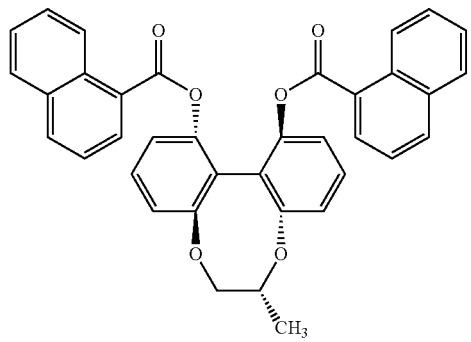

Inv-40

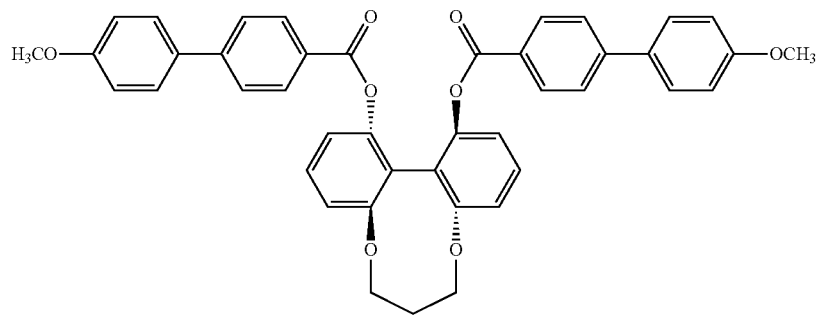

Chiral dopants of this invention can be readily prepared by those skilled in the art employing standard chemical transformations or by analogy to the reaction schemes shown below. Further, these materials can be isolated in enantiomerically pure form using standard methods including but not limited to: chiral HPLC, chiral synthesis, chemical or chromatographic separation of chiral derivatives of the biphenyltetrols, e.g. via diastereomeric esters, urethanes, carbonates, and the like. The material [1,1'-biphenyl]-2,2',6,6'-tetrol may be purchased from Asymchem, Morrisville, N.C., 27560. The material [1,1'-biphenyl]-2,2',5,5'-tetrol may be prepared by one skilled in the art by the iron trichloride coupling of phenolates by the procedure reported in *Tetrahedron Letters* (1992), 33(16), 2207-2210. The material [1,1'-biphenyl]-2,2',4,4'-tetrol may be purchased from City Chemical LLC, West Haven, Conn., 06516. The materials (S)-(+)-1,2-propanediol and (R)-(−)-1,2-propanediol may be purchased from Sigma-Aldrich Chemical Company, St. Louis, Mo. Chiral dibenzodioxocin diols may be prepared by one skilled in the art as shown in Scheme 1 below by, or by analogy to, the procedure described in *Organic Letters* (2000), 2(9), 1319-1322. The use of S-(+)-1,2-propanediol and [1,1'-biphenyl]-2,2',6,6'-tetrol results in the formation of (6R,12aS)6,7-dihydro-6-methyl-dibenzo[e,g][1,4]dioxocin-1,12-diol, compound C in Scheme 1. The use of R-(−)-1,2-propanediol and [1,1'-biphenyl]-2,2',6,6'-tetrol results in the formation of (6S,12aR)6,7-dihydro-6-methyl-dibenzo[e,g][1,4]-dioxocin-1,12-diol, compound D in Scheme 1. By analogy, (6R,12aS)6,7-dihydro-6-methyl-dibenzo[e,g][1,4]dioxocin-2,11-diol, compound E in Scheme 1, can be formed from S-(+)-1,2-propanediol and [1,1'-biphenyl]-2,2',5,5'-tetrol. Further, by analogy, (6R,12aS)6,7-dihydro-6-methyl-dibenzo[e,g][1,4]dioxocin-3,10-diol, compound F in Scheme 1, can be formed from S-(+)-1,2-propanediol and [1,1'-biphenyl]-2,2',4,4'-tetrol. Further it will be understood by one skilled in the art, by analogy, use of (R)-(−)-1,2-propanediol will result in (6S, 12aR)6,7-dihydro-6-methyl-dibenzo[e,g][1,4]dioxocin-2, 11-diol, and (6S,12aR)6,7-dihydro-6-methyl-dibenzo[e,g] [1,4]dioxocin-3,10-diol.

The materials chiral 6,6'-disubstituted 2,2'-biphenyldiols, compounds G in Scheme 2, may be prepared by one skilled in the art, for example, as shown in Scheme 2 below by, or by analogy to, the procedure described in *Tetrahedron* (1997), 53(49), 16663-16678.

The esters of chiral biphenyldiols may be prepared by one skilled in the art, as for example shown in Scheme 3 below for Inv-3 by, or by analogy to, the reaction of carboxylic acid chlorides with chiral biphenyldiols, or by the reaction of carboxylic acids with chiral biphenyldiols in the presence of dicyclohexylcarbodiimide with a catalytic amount of dimethylaminopyridine. Other compounds of the invention can be prepared via modifications of these procedures or via implementation of reactions know to those skilled in the art.

Scheme 1.

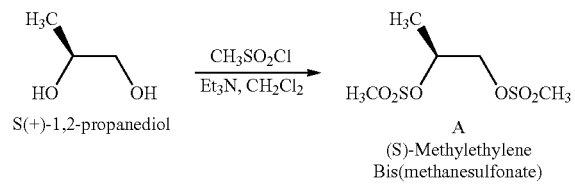

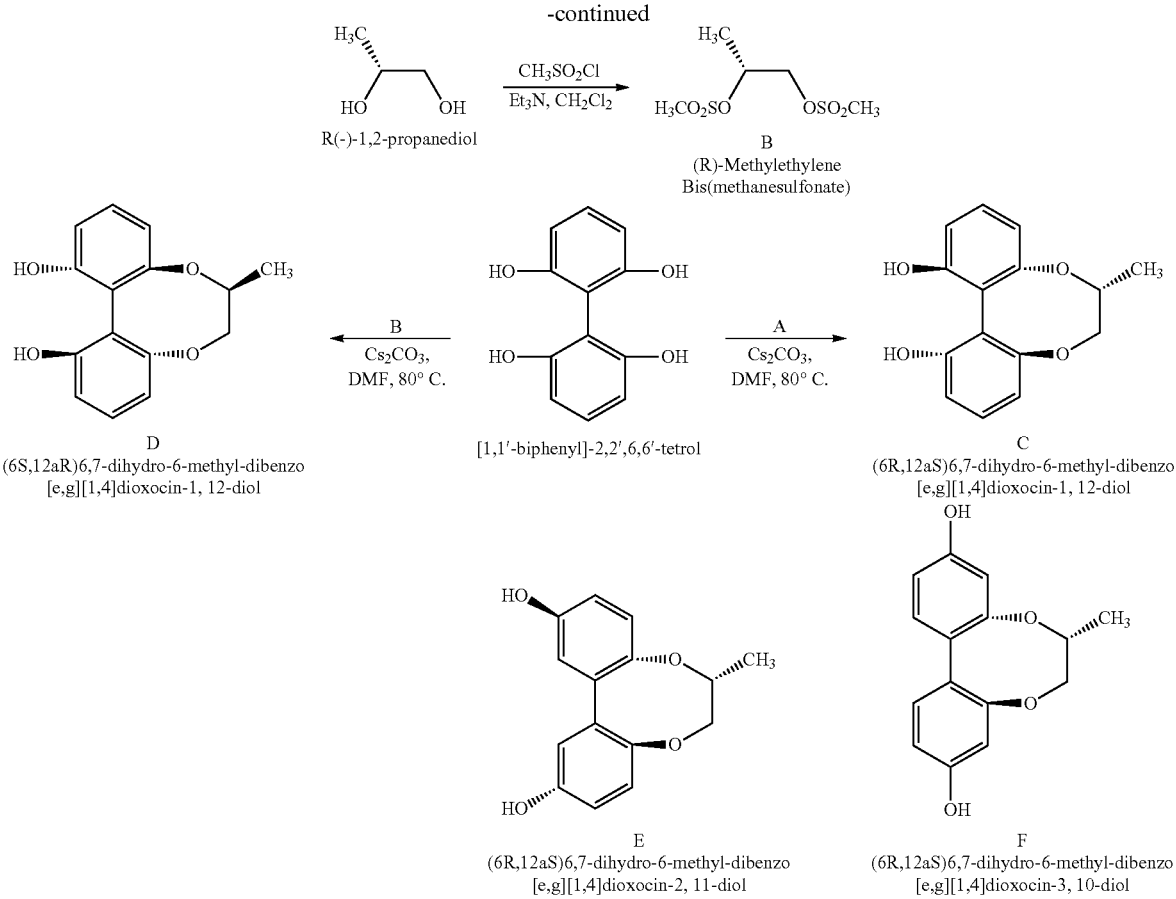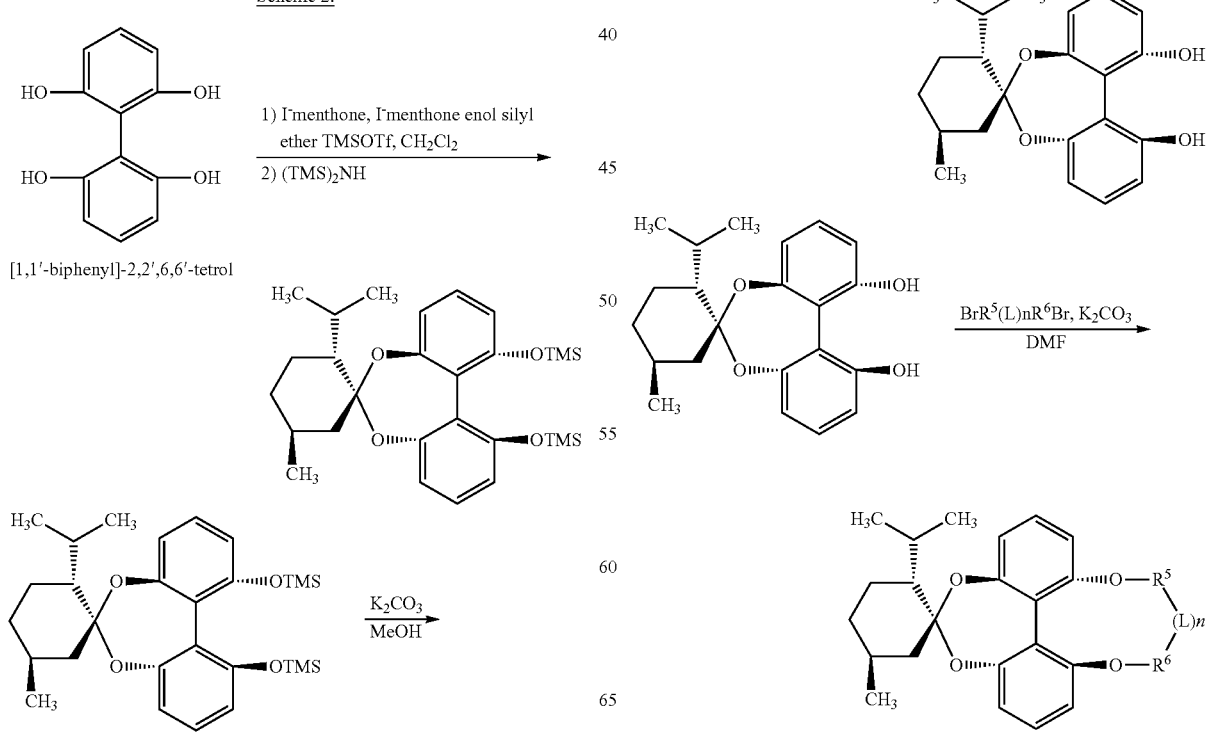

29
-continued
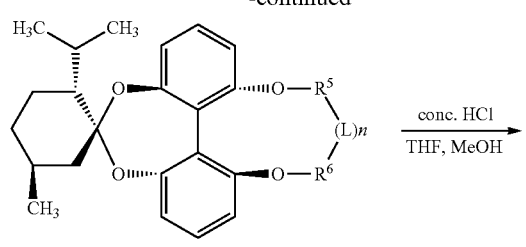
30
-continued
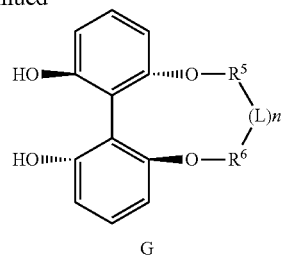
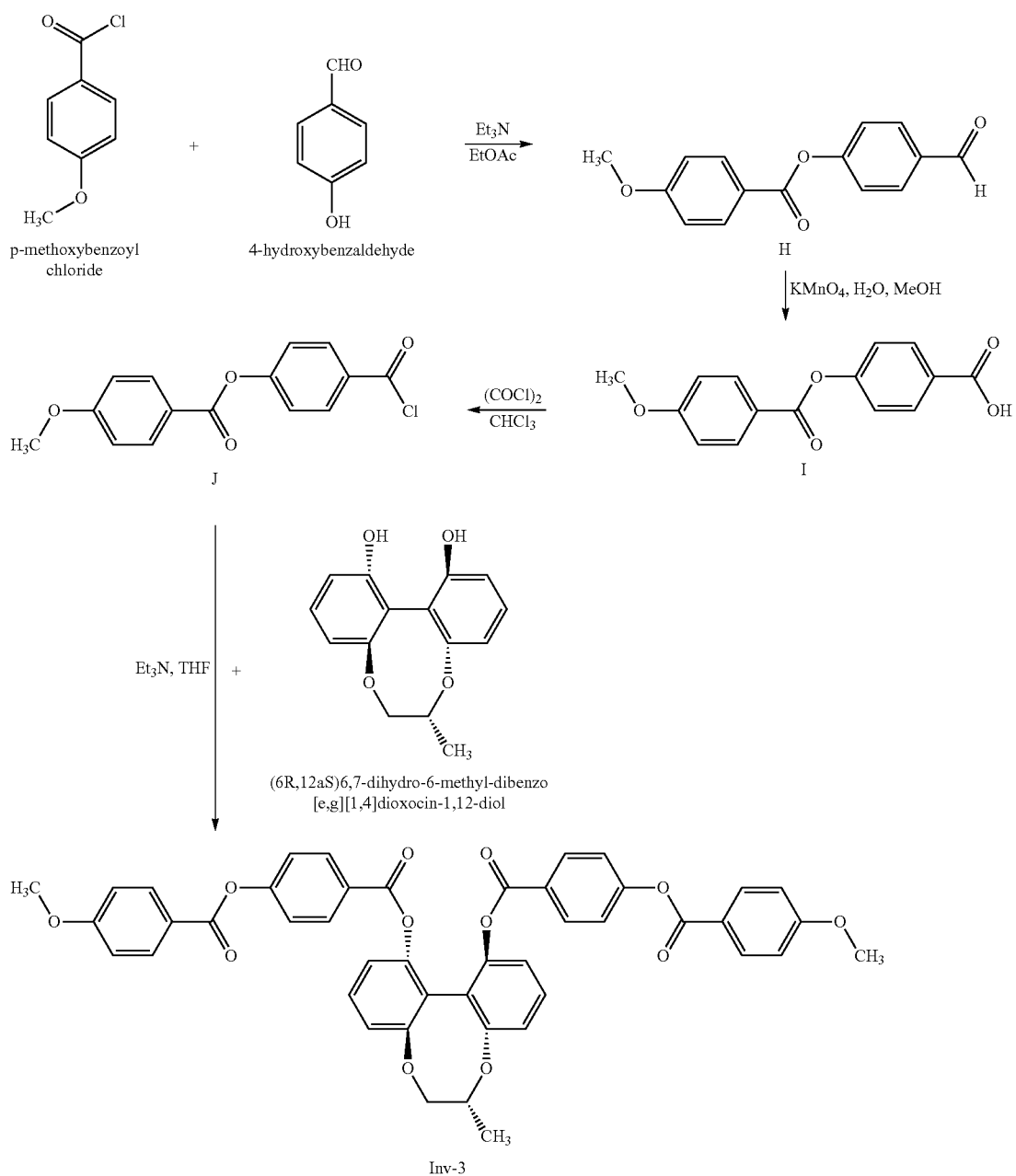

Examples

The following examples are presented to illustrate the practice of this invention, but are not meant to limit it in any way.

(S)-Methylethylene Bis(methylsulfonate), CAS 270577-16-7, Compound A Scheme 1, was prepared from (S)-(+)-1,2-propanediol (CAS 4254-15-3, Sigma Aldrich Chemical Company) and methane sulfonyl chloride (CAS 124-63-O, Sigma Aldrich Chemical Company) according to the procedure of T. Harada, T. Mai, T. Tuyet, and A. Oku, *Organic Letters* (2000), 2(9), 1319-1322.

(6R,12aS)6,7-Dihydro-6-methyl-dibenzo[e,g][1,4]-dioxocin-1,12-diol, CAS 271249-37-7, Compound C Scheme 1, was prepared from [1,1'-Biphenyl]-2,2',6,6'-tetrol (CAS 4371-35-1, Asymchem Labs) and (S)-methylene bis(methylsulfonate) (CAS 270577-16-7) according to the procedure of T. Harada, T. Mai, T. Tuyet, and A. Oku, *Organic Letters* (2000), 2(9), 1319-1322.

Preparation of Inv-2:

4'-Propyl[1,1'-biphenyl]-4-carboxylic acid chloride, CAS 65195-14-4.

Into a 250 mL three neck round bottom flask was placed a magnetic stir bar, 3.60 grams (15 mmol) of 4-(-n-propylphenyl)benzoic acid (CAS RN 88038-94-2, TCI America Chemicals Inc.) and 50 mL of chloroform (CAS 865-49-6, Sigma-Aldrich Chem. Co.). To the magnetically stirred slurry was added 5 drops of dimethylformamide (CAS 68-12-2, Alfa-Aesar Chemical Co.) and the reaction was placed under a nitrogen atmosphere then placed in an ice water bath and chilled to 5-10° C. To the stirred heterogeneous mixture was added 3.81 grams (30 mmol) of oxalyl chloride (CAS 79-37-8, Alfa-Aesar Chem. Co.) dropwise from a capillary pipet over approximately 3 minutes. The reaction was then removed from the ice bath and stirred at room temperature for 2 hours. The resulting homogeneous light yellow solution was placed in a pre-heated 40° C. oil bath and warmed with stirring at 40° C. for 30 minutes. The product mixture was removed from the oil bath, filtered through fine filter paper using a Buchner funnel to remove particulates, then the light yellow solution was concentrated to dryness in vacuo. To the flask was added 50 mL chloroform and concentrated to dryness a second time to remove residual oxalyl chloride. The product mixture afforded a light yellow thick liquid which crystallized on cooling to room temperature. The collected weight was 4.16 grams which was used without further purification.

(6R,12aS)-6,7-Dihydro-6-methyl-dibenzo[e,g][1,4]dioxocin-1,12-[di[4-(4-n-propylphenyl)benzoate]], Inv-2.

Into a 100 mL single neck round bottom flask was placed 1.0 gram (3.9 mmol) of (6R,12aS)6,7-dihydro-6-methyl-dibenzo[e,g][1,4]-dioxocin-1,12-diol (CAS 271249-37-7), 25 mL of ethyl acetate (CAS 141-78-6, Acros Organics) and a magnetic stirring bar. The mixture was stirred magnetically at room temperature and 3.0 grams (30 mmol) of triethylamine (CAS 121-44-8, Acros Organics) was added all at once. The mixture was stirred at room temperature and a solution of 4'-propyl[1,1'-biphenyl]-4-carboxylic acid chloride (CAS 65195-14-4) prepared as above, in 7 mL of ethyl acetate was added dropwise using a pressure equalized dropping funnel over a period of 10 minutes. A white precipitate of triethylamine hydrochloride formed after about 1 minute into the addition. The heterogeneous mixture was stirred at room temperature for one hour, then placed in a pre-heated oil bath at 40° C. and heated at 40° C. for 12 hours. After stirring for this time the light tan colored product mixture was removed from the oil bath, cooled to room temperature and filtered using medium filter paper on a Buchner funnel to remove the precipitated triethylamine hydrochloride. The filtrate was chilled in ice water to precipitate additional triethylamine hydrochloride which was removed by filtration. The filtrate was concentrated to dryness in vacuo to afford a tan viscous gum of collected weight 4.49 grams. This material was chromatographed on a flash column of silica gel (EMD silica gel 60, 230-400 mesh, column size 5 cm×36 cm) slurry packed in 10% ethyl acetate/90% hexane. The column was eluted under mild air pressure taking 100 mL fractions and gradually increasing the percentage of ethyl acetate in the eluting solvent. The desired product eluted in fractions 7-11 using 30% ethyl acetate/70% hexane affording 2.25 grams of an amorphous semi-crystalline glassy solid after solvent removal in vacuo. The product was crystallized by dissolving in 60 mL absolute ethanol (CAS 64-17-5, Acros Organics) by heating to boiling and allowing to stand overnight at room temperature. The recrystallization was repeated using 125 mL absolute ethanol to afford 1.32 grams of off-white powder product, m.p.=147-149° C. This material was pure chromatographically. NMR (CDCl$_3$) 8.08 (pseudo d, 4H), 7.67 (pseudo d, 4H), 7.57 (pseudo d, 4H), 7.40 (pseudo t, 2H), 7.30 (pseudo d, 4H), 7.14 (m, 4H), 4.46 (d of d, 1H), 4.36 (m, 1H), 3.83 (pseudo t, 1H), 2.67 (t, 4H), 1.71 (m, 4H), 1.39 (d, 3H), 1.00 (t, 6H).

Preparation of Inv-3:

4-(4'-Methoxybenzoyloxy)benzaldehyde, CAS 56800-26-1, Compound H Scheme 3.

Into a 500 mL three neck round bottom flask was placed 12.2 grams (0.1 moles) of 4-hydroxybenzaldehyde (CAS 123-08-O, Sigma Aldrich Chemical Company), 12.15 grams of triethylamine (CAS 121-44-8, Acros Organics), and 200 mL of ethyl acetate (CAS 141-78-6, Acros Organics). The flask was fitted with a thermometer, 100 mL pressure equalized dropping funnel, condenser with nitrogen inlet and magnetic stirring bar. The mixture was stirred at room temperature, then a solution of 17.9 grams (0.105 moles) of p-methoxy benzoyl chloride (CAS 100-07-2, Sigma Aldrich Chemical Company) in 50 mL of ethyl acetate was added dropwise over a period of 20 minutes. The reaction developed a white precipitate and spontaneously heated to a temperature of 35° C. The heterogeneous reaction mixture was stirred at room temperature for one hour then placed in a pre-heated oil bath at 40° C. and heated with stirring for an additional two hours. After cooling to room temperature the product mixture was filtered through medium filter paper on a Buchner funnel to remove triethylamine hydrochloride. The filtrate was concentrated to dryness at 45° C. in vacuo to afford a collected weight of 26.55 grams of off-white solid. The product was crystallized from 100 mL of absolute ethanol (CAS 64-17-5, Acros Organics) by heating to boiling then allowing the solution to cool to room temperature over 90 minutes, then chilled in ice water for one hour. The product of collected weight 24.1 grams was chromatographically pure (TLC, 30% ethyl acetate/70% hexane, Rf=0.61), m.p.=87-88° C. (literature melting point=89° C., J. McIntyre, et. al., *Mol. Cryst. Liq. Crys.* (1982), 80, 105-118).

4-(4'-Methoxybenzoyloxy)benzoic acid, CAS 52899-69-1, Compound I Scheme 3, was prepared from 4-(4'-Methoxybenzoyloxy)benzaldehyde (CAS 56800-26-1, prepared as above), and saturated aqueous potassium permanganate (CAS 7722-64-7, Sigma Aldrich Chemical Company) in methanol (CAS 67-56-1, Sigma Aldrich Chemical Company) according to the procedure of T. Currie and A. Russell, *J. Chem. Soc.* (1932), 2263-2265, m.p=214-215° C.

4-[(4'-Methoxybenzoyl)oxy]benzoyl chloride, CAS 52899-54-4, Compound J of Scheme 3.

Into a 250 mL three neck round bottom flask was placed a magnetic stir bar, 4.08 grams (15 mmol) of 4-(4'-methoxybenzoyloxy)benzoic acid (CAS 52899-69-1, as prepared above), and 50 mL chloroform (CAS 865-49-6, Sigma-Aldrich Chem. Co.). To the magnetically stirred slurry was added 5 drops of dimethylformamide (CAS 68-12-2, Alfa-Aesar Chemical Co.) and the reaction was placed under a nitrogen atmosphere then placed in an ice water bath and chilled to 5-10° C. To the stirred heterogeneous mixture was added 3.81 grams (30 mmol) of oxalyl chloride (CAS 79-37-8, Alfa-Aesar Chem. Co.) dropwise from a capillary pipet over approximately 3 minutes. The reaction was then removed from the ice bath and stirred at room temperature for 1 hour. The resulting homogeneous light yellow solution was placed in a pre-heated 40° C. oil bath and warmed with stirring at 40° C. for 30 minutes. The product mixture was removed from the oil bath and concentrated to dryness in vacuo to afford an off-white solid. To the flask was added 50 mL chloroform and concentrated to dryness a second time to remove residual oxalyl chloride. The product mixture afforded an off-white solid. The collected weight was 4.9 grams which was used without further purification.

(6R,12aS)-6,7-Dihydro-6-methyl-dibenzo[e,g][1,4]dioxocin-1,12-[di[4-(4'-methoxybenzoyl)oxy]benzoate], Inv-3.

Into a 100 mL single neck round bottom flask was placed 1.0 grams (3.8 mmoles) of (6R,12aS)6,7-dihydro-6-methyl-dibenzo[e,g][1,4]-dioxocin-1,12-diol (CAS 271249-37-7), and 20 mL of tetrahydrofuran (CAS 109-99-9, Acros Organics) and a magnetic stirring bar. The mixture was stirred at room temperature and 3.0 grams (30 mmol) of triethylamine (CAS 121-44-8, Acros Organics) was added all at once. The mixture was stirred at room temperature and a warmed solution of 4-[(4'-methoxybenzoy)oxy]benzoyl chloride in 30 mL tetrahydrofuran was rapidly added using a 60 mL pressure equalized dropping funnel over an approximately 3 minute period. A white precipitate of triethylamine hydrochloride formed immediately. The reaction was placed in a 40° C. pre-heated oil bath and heated at 40° C. for 36 hours. The product mixture was removed from the oil bath, cooled to room temperature and filtered though medium filter paper on a Buchner funnel to remove the insoluble triethylamine hydrochloride precipitate. The filtrate was concentrated to dryness in vacuo to afford 6.12 grams of crude product. This material was chromatographed on a flash column of silica gel (EMD silica gel 60, 230-400 mesh, column size 5 cm×36 cm) slurry packed in 10% ethyl acetate/90% hexane. The column was eluted under mild air pressure taking 100 mL fractions and gradually increasing the percentage of ethyl acetate in the eluting solvent. The desired product eluted in fractions 3-10 using 50% ethyl acetate/50% hexane affording 2.88 grams of clear colorless viscous oil after solvent removal in vacuo. The chromatography was repeated to remove small levels of impurities and afford 2.21 grams of chromatographically pure material. The product was crystallized by dissolving in 10 mL dichloromethane (CAS 75-09-2, Sigma Aldrich Chemical Company) then slowly adding to 100 mL absolute ethanol (CAS 64-17-5, Acros Organics) while heating on a hot plate. The volume was reduced to 90 mL then allowed to slowly cool with stirring. When the clear colorless solution became cloudy the mixture was placed in an ice water bath for 30 minutes. The product precipitated as a fine white powder and was collected with medium filter paper on a Buchner funnel, then dried under medium vacuum to afford 1.81 grams of white powder, m.p.=107-110° C. This material was pure chromatographically. NMR (CDCl$_3$) 8.18 (pseudo d, 4H), 8.07 (d of d, 4H), 7.38 (pseudo t, 2H), 7.30 (pseudo d, 4H), 7.12 (m, 4H), 7.01 (pseudo d, 4H), 4.46 (d of d, 1H), 4.35 (m, 1H), 3.93 (s, 6H), 3.83 (pseudo t, 1H), 1.38 (d, 3H).

Preparation of Inv-29:

(S)-6H-7,8-Dihydro-dibenzo[f,h][1,5]dioxonin-1,13-diol can be prepared as reported by T. Harada, et. al. in *Tetrahedron* (1997), 53(49), 16663-16678.

(S)-7,8-Dihydro-6H-dibenzo[f,h][1,5]dioxonin-1,13-[di[4-(4-n-propylphenyl)benzoate]], Inv-29.

Into a 100 mL single neck round bottom flask was placed 0.66 grams (2.5 mmol) of (S)-6H-7,8-dihydro-dibenzo[f,h][1,5]dioxonin-1,13-diol, CAS 162085-52-1, mL of tetrahydrofuran and a magnetic stirring bar. The mixture was stirred magnetically at room temperature until homogeneous and 1.32 gram (13 mmol) of triethylamine (CAS 121-44-8, Acros Organics) was added all at once. The mixture was stirred at room temperature and a solution of 1.82 gram (6.2 mmol) of 4'-propyl[1,1'-phenyl]-4-carboxylic acid chloride, CAS 39649071-3, in 5 mL of tetrahydrofuran was added dropwise over a period of 5 minutes. The reaction was stirred under a nitrogen atmosphere at room temperature for one hour, then at 40° C. for 18 hours. The product mixture was removed from the oil bath, cooled to room temperature and filtered though medium filter paper on a Buchner funnel to remove the insoluble triethylamine hydrochloride precipitate. The filtrate was placed in a 250 mL separatory funnel and extracted two times with 25 mL of 10% hydrochloric acid, three times with 50 mL of distilled water, then one time with 50 mL of saturated aqueous sodium chloride solution. The organic layer was dried by stirring with anhydrous magnesium sulfate for one hour then gravity filtered through fluted medium filter paper. The filtrate was concentrated to dryness in vacuo to afford 2.15 grams of crude product. The product mixture was chromatographed on a flash column of silica gel (Acros Organics, 0.035-0.070 mm, 60A, column size 5 cm×35 cm) slurry packed in 10% ethyl acetate/90% hexane. The column was eluted under mild air pressure taking 100 mL fractions and gradually increasing the percentage of ethyl acetate in the eluting solvent. The desired product eluted in fractions 2-6 using 30% ethyl acetate/70% hexane affording 0.76 grams of clear a tan viscous glass after solvent removal in vacuo. The material was crystallized by dissolving in 3 mL of dichloromethane then adding that solution dropwise via pipet to 25 mL of boiling ethanol with constant magnetic stirring. The mixture was reduced by boiling to a volume of 20 mL then was allowed to cool to room temperature without stirring for one hour. An amorphous off-white solid precipitated. The mixture was chilled in ice water for 30 minutes then the precipitated solid was collected by vacuum filtration on a Buchner funnel. The cream colored powder was washed with ethanol, then hexane, then dried on the Buchner funnel for 2 hours then further dried under high vacuum for 18 hours to afford 0.42 grams of off-white product, m.p.=96-98° C. This material was pure chromatographically. NMR (CDCl$_3$) 8.10 (pseudo d, 4H), 7.66 (pseudo d, 4H), 7.57 (pseudo d, 4H), 7.36 (pseudo t, 2H), 7.29 (m, 4H), 7.07 (pseudo d of d, 4H), 4.42 (m, 4H), 2.67 (t, 4H), 2.05 (m, 2H), 1.71 (m, 4H), 1.01 (t, 6H).

Preparation of Inv-30:

6-(Benzyloxy)-2-naphthoic acid (CAS 114804-77-2) was prepared from 6-hydroxy-2-naphthoic acid (CAS 16712-64-4, TCI America Chemical Company) according to the procedure of R. Dabrowski, et. al., *Ferroelectrics* (2006), 343, 11-18, m.p=252-254° C.

6-(Benzyloxy)-2-naphthalene carbonyl chloride, CAS 122179-30-0.

Into a 250 mL three neck round bottom flask was placed a magnetic stir bar, 3.34 grams (12 mmol) of 6-(benzyloxy)-2-naphthoic acid (CAS 114804-77-2, as prepared above), and 50 mL chloroform (CAS 865-49-6, Sigma-Aldrich Chem. Co.). To the magnetically stirred slurry was added 5 drops of dimethylformamide (CAS 68-12-2, Alfa-Aesar Chemical Co.) and the reaction was placed under a nitrogen atmosphere then placed in an ice water bath and chilled to 5-10° C. To the stirred heterogeneous mixture was added 3.18 grams (25 mmol) of oxalyl chloride (CAS 79-37-8, Alfa-Aesar Chem. Co.) dropwise from a capillary pipet over approximately 3 minutes. The reaction was then removed from the ice bath and stirred at room temperature for 1 hour. The resulting homogeneous light yellow solution was placed in a pre-heated 40° C. oil bath and warmed with stirring at 40° C. for 1 hour. The product mixture was removed from the oil bath, filtered through fine filter paper to remove trace particulates, and then the filtrate was concentrated to dryness in vacuo to afford an off-white solid. To the flask was added 50 mL chloroform and concentrated to dryness a second time to remove residual oxalyl chloride. The product mixture afforded an off-white solid. The collected weight was 3.5 grams which was used without further purification.

(6R,12aS)-6,7-Dihydro-6-methyl-dibenzo[e,g][1,4]dioxocin-1,12-[di[2-(6-benzyloxy)naphthoate]], Inv-30.

Into a 100 mL single neck round bottom flask was placed 1.0 grams (3.8 mmoles) of (6R,12aS)6,7-dihydro-6-methyl-dibenzo[e,g][1,4]-dioxocin-1,12-diol (CAS 271249-37-7), and 20 mL of tetrahydrofuran (CAS 109-99-9, Acros Organics) and a magnetic stirring bar. The mixture was stirred at room temperature and 2.5 grams (25 mmol) of triethylamine (CAS 121-44-8, Acros Organics) was added all at once. Then 3.5 grams (12 mmol) of 6-(benzyloxy)-2-naphthalene carbonyl chloride (CAS 122179-30-0, prepared as above) dissolved in 20 mL of tetrahydrofuran was added over 8 minutes dropwise using a 25 mL pressure equalized dropping funnel. The reaction was stirred under a nitrogen atmosphere at room temperature for one hour then heated at 40° C. for 18 hours. The product mixture was removed from the oil bath, cooled to room temperature and filtered though medium filter paper on a Buchner funnel to remove the insoluble triethylamine hydrochloride precipitate. The light tan filtrate was transferred to a 250 mL single neck round bottom flask and concentrated in vacuo to dryness to afford 4.34 grams of crude product mixture as a glassy foam. The product mixture was chromatographed on a flash column of silica gel (Acros Organics, 0.035-0.070 mm, 60A, column size 5 cm×35 cm) slurry packed in 10% ethyl acetate/90% hexane. The column was eluted under mild air pressure taking 100 mL fractions and gradually increasing the percentage of ethyl acetate in the eluting solvent. The desired product eluted in fractions 21-35 using 30% ethyl acetate/70% hexane affording 3.05 grams of a white glassy amorphous solid after solvent removal in vacuo. The product was crystallized by dissolving the crude product in 30 mL of dichloromethane then this solution was added dropwise to 200 mL of boiling ethanol by using a pipet over a period of approximately 5 minutes with constant slow magnetic stirring. The homogeneous and clear mixture was boiled to a volume of 190 mL then slowly allowed to cool to room temperature without stirring. The room temperature cloudy mixture was placed in an ice water bath and stirred rapidly for one hour. The precipitated product was collected on a Buchner funnel with medium filter paper and the white crystals were washed twice with 5 mL of ethanol, then once with 10 mL of hexane. The solid was dried on the Buchner funnel for 30 minutes, then in a vacuum oven at 70° C. for 16 hours, to afford 1.78 grams of product as very fine white crystals, m.p.=98-102° C. This material was pure chromatographically. NMR (CDCl$_3$) 8.51 (s, 2H), 8.01 (pseudo t, 2H), 7.78 (pseudo d of d, 4H), 7.53-7.13 (m, 20H), 5.24 (s, 4H), 4.47 (pseudo d, 1H), 4.40 (m, 1H), 3.86 (pseudo t, 1H), 1.40 (d, 3H).

Preparation of Inv-32:

Dibenzo[d,f][1,3]dioxepin-1,1'-diol, CAS 189299-65-8, was prepared from [1,1'-Biphenyl]-2,2',6,6'-tetrol (CAS 4371-35-1, Asymchem Labs) and diiodomethane (CAS 75-11-6, Sigma Aldrich Company) using the procedure reported by G. Delogu, et. al, in *Tetrahedron: Asymmetry*, (1997), 8(5), 759-763.

1,11-Bis-(L-menthyloxy-carbonyloxy)dibenzo[d,f][1,3]-dioxepin, Inv-32.

Into a 100 mL single neck round bottom flask was placed a magnetic stir bar, 0.92 grams (4 mmol) of dibenzo[d,f][1,3]dioxepin 1,11-diol (CAS 189299-65-8, prepared as above) and 50 mL of dichloromethane. To the heterogeneous mixture at room temperature was added with stirring 1.62 grams (16 mmol) triethylamine (CAS 121-44-8, Acros Organics) rendering the mixture water clear and colorless. Then, 0.05 grams of dimethylaminopyridine (CAS 1122-58-3, Sigma Aldrich Chemical Company) was added and stirred for 5 minutes. To this solution at room temperature was added 2.2 grams (10 mmol) of L-menthyl chloroformate (CAS 14602-86-9, Sigma Aldrich chemical Company) using a pipet dropwise over 2 minutes. After stirring for 5 minutes the reaction color becomes light tan. The reaction was stirred at room temperature for 18 hours. Thin layer chromatography showed complete consumption of dibenzo[d,f][1,3]dioxepin 1,11-diol. The reaction was diluted with 50 mL dichloromethane, then poured into a 250 mL separatory funnel and washed twice with 50 mL distilled water, twice 25 mL 105 hydrochloric acid, three times with 50 mL distilled water then twice with 25 mL aqueous saturated sodium chloride solution. The resulting dichloromethane solution was dried by stirring with magnesium sulfate for one hour, then gravity filtered through medium filter paper. Concentration of the filtrate in vacuo afforded 2.86 grams of crude product as a viscous colorless liquid. The product was chromatographed on a flash column of silica gel (Acros Organics, 0.035-0.070 mm, 60A, column size 4.5 cm×40 cm) slurry packed in 10% ethyl acetate/90% hexane. The column was eluted under mild air pressure taking 100 mL fractions. The desired product eluted in fractions 8-11 using 10% ethyl acetate/90% hexane affording 2.08 grams of a clear colorless glass after solvent removal in vacuo. This material was pure chromatographically. Proton NMR (CDCl$_3$) 7.44-7.39 (m, 2H), 7.21-7.14 (m, 4H), 5.60-5.59 (two singlets, 2H), 4.46-4.42 (m, 2H), 2.12-2.02 (m, 2H), 1.7-1.63 (m, 6H), 1.45-1.36 (m, 4H), 1.06-0.80 (m, 21H), 0.57 (d, 3H). Carbon NMR (CDCl$_3$) 153.69, 153.62, 152.53, 152.35, 148.42, 148.37, 129.71, 129.68, 122.47, 122.40, 119.56, 119.17, 118.71, 102.68, 102.61, 79.23, 79.21, 46.85, 46.65, 40.35, 39.98, 34.08, 33.99, 31.39, 31.24, 25.79, 25.65, 23.14, 22.02, 21.90, 20.80, 20.76, 16.14, 15.99.

Preparation of Inv-37:

4-(Benzoyloxy)benzoic acid (CAS 28547-23-1) was prepared from 4-hydroxybenzoic acid (CAS 99-96-7, Sigma Aldrich Chemical Company) and benzoyl chloride (CAS 98-88-4, Sigma Aldrich Chemical Company) according to the procedure of C. Wu, et. al., *J. Appl. Polym. Sci.*, (2004), 92, 2693-2697, m.p=223-224° C.

4-(Benzoyloxy)benzoyl chloride, CAS 58860-84-7.

Into a 250 mL three neck round bottom flask was placed a magnetic stir bar, 2.91 grams (12 mmol) of 4-(benzoyloxy)benzoic acid (CAS 28547-23-1, as prepared above), and 50 mL chloroform (CAS 865-49-6, Sigma-Aldrich Chem. Co.).

To the magnetically stirred slurry was added 5 drops of dimethylformamide (CAS 68-12-2, Alfa-Aesar Chemical Co.) and the reaction was placed under a nitrogen atmosphere then placed in an ice water bath and chilled to 5-10° C. To the stirred heterogeneous mixture was added 3.18 grams (25 mmol) of oxalyl chloride (CAS 79-37-8, Alfa-Aesar Chem. Co.) dropwise from a capillary pipet over approximately 1 minute. The reaction was then removed from the ice bath and stirred at room temperature for 1 hour. The resulting homogeneous light yellow solution was placed in a pre-heated 40° C. oil bath and warmed with stirring at 40° C. for 1 hour. The product mixture was removed from the oil bath and concentrated to dryness in vacuo to afford an off-white solid. To the flask was added 50 mL chloroform and concentrated to dryness a second time to remove residual oxalyl chloride. The product mixture afforded an off-white solid. The collected weight was 3.16 grams which was used without further purification.

(6R,12aS)-6,7-Dihydro-6-methyl-dibenzo[e,g][1,4]dioxocin-1,12-[di[4-(benzoyloxy)benzoate]], Inv-37.

Into a 100 mL single neck round bottom flask was placed 1.0 grams (3.9 mmoles) of (6R,12aS)6,7-dihydro-6-methyl-dibenzo[e,g][1,4]-dioxocin-1,12-diol (CAS 271249-37-7), and 20 mL of tetrahydrofuran (CAS 109-99-9, Acros Organics) and a magnetic stirring bar. The mixture was stirred at room temperature and 2.5 grams (25 mmol) of triethylamine (CAS 121-44-8, Acros Organics) was added all at once. Then 3.16 grams (12 mmol) of 4-(benzoyloxy)benzoyl chloride (CAS 58860-84-7, prepared as above) dissolved in 20 mL of tetrahydrofuran was added over 10 minutes dropwise using a 25 mL pressure equalized dropping funnel. The reaction was stirred under a nitrogen atmosphere at room temperature for one hour then heated at 40° C. for 18 hours. The product mixture was removed from the oil bath, cooled to room temperature and filtered though medium filter paper on a Buchner funnel to remove the insoluble triethylamine hydrochloride precipitate. The light tan filtrate was transferred to a 250 mL single neck round bottom flask and concentrated in vacuo to dryness to afford 3.88 grams of crude product mixture as an amorphous gum. The product mixture was chromatographed on a flash column of silica gel (Acros Organics, 0.035-0.070 mm, 60A, column size 5 cm×35 cm) slurry packed in 30% ethyl acetate/70% hexane. The column was eluted under mild air pressure taking 100 mL fractions and gradually increasing the percentage of ethyl acetate in the eluting solvent. The desired product eluted in fractions 6-10 using 40% ethyl acetate/60% hexane and fractions 1-2 using 50% ethyl acetate/50% hexane affording 3.14 grams of a white glassy amorphous solid after solvent removal in vacuo. The product was crystallized by dissolving the crude product in 30 mL of dichloromethane then this solution was added dropwise to 200 mL of boiling ethanol by using a pipet over a period of approximately 1 minute with constant slow magnetic stirring. The homogeneous and clear mixture was boiled to a volume of 150 mL then slowly allowed to cool to room temperature without stirring. The room temperature cloudy mixture was placed in an ice water bath and stirred slowly for one hour. The precipitated product was collected on a Buchner funnel with medium filter paper and the white crystals were washed twice with 5 mL of ethanol, then once with three times with 10 mL of hexane. The solid was dried on the Buchner funnel for one hour, then in a vacuum oven at 60° C. for 16 hours, to afford 1.58 grams of product as very fine white crystals, m.p.=106-108° C. This material was pure chromatographically. NMR (CDCl$_3$) 8.21 (pseudo d, 4H), 8.10 (m, 4H), 7.68 (pseudo t, 2H), 7.54 (pseudo t, 4H), 7.38 (m, 2H), 7.32 (pseudo d, 4H), 7.13 (pseudo t, 4H), 4.46 (pseudo d, 1H), 4.37 (m, 1H), 3.83 (pseudo t, 1H), 1.39 (d, 3H).

Fabrication of Test Cell

The display cell is fabricated from two 0.7 mm thick glass substrates (2 in×2 in) each coated with indium tin oxide (ITO), hard coat, and polyimide. The two glass pieces are held together with a gasket material and spacers to maintain a cell thickness of 5 microns. A small gap is left in the gasket material to fill the cell with the cholesteric liquid crystal mixture. The cholesteric liquid crystal mixture consists of a small percentage of the invented chiral dopant compound and a large percentage of a nematic liquid crystal (LC1) with high birefringence and high dielectric anisotropy. Prior to filling, the mixture is heated to isotropic to ensure that all components are mixed and the mixture is a homogeneous solution. Then, the mixture is vacuum filled into the cell. Once the cell is made, the cell is placed in an oven set to 100° C. to clear the liquid crystal to the isotropic. After 10 minutes, the cell is removed from the oven and the cell is allotted 30 minutes to cool to the focal conic texture. Once cooled, the cell is electrically switched to the planar texture with a voltage of 45 volts at a pulsewidth of 100 ms at a frequency of 250 Hz.

Evaluation of Chiral Material

To determine the helical twisting power of the invented chiral, the peak wavelength of the planar texture is measured using a Minolta spectrophotometer, which is comprised of an integrating sphere and a strobing white light source. Using the following equation, an approximate value for the HTP is calculated:

$$\beta = \frac{\overline{n}}{c}\left(\frac{1}{\lambda}\right),$$

where $\beta$ is the helical twisting power, $\overline{n}$ is the refractive index of the nematic host, $\lambda$ is the peak wavelength of the current sample. A chiral dopant with an HTP greater than 40 $\mu m^{-1}$ is interesting for further investigation. The measured peak wavelengths and HTPs of several examples are shown in Table 1.

TABLE 1

Amount of chiral material in cholesteric mixture and measured HTP for each invented material.

| Chiral | % of Chiral in Mixture | % of LC1 in Mixture | Measured Peak λ | Measured HTP |
| --- | --- | --- | --- | --- |
| Inv-1 | 4.58% | 95.42% | 572 nm | 63 $\mu m^{-1}$ ± 0.9 $\mu m^{-1}$ |
| Inv-2 | 3.37% | 96.63% | 578 nm | 84 $\mu m^{-1}$ ± 1 $\mu m^{-1}$ |
| Inv-3 | 4.08% | 95.92% | 582 nm | 70 $\mu m^{-1}$ ± 1 $\mu m^{-1}$ |
| Inv-29 | 4.00% | 96.00% | 528 nm | 78 $\mu m^{-1}$ ± 1 $\mu m^{-1}$ |
| Inv-30 | 4.92% | 95.08% | 574 nm | 58 $\mu m^{-1}$ ± 1 $\mu m^{-1}$ |
| Inv-33 | 3.46% | 96.54% | 573 nm | 83 $\mu m^{-1}$ ± 1 $\mu m^{-1}$ |
| Inv-34 | 3.88% | 96.12% | 573 nm | 74 $\mu m^{-1}$ ± 1 $\mu m^{-1}$ |
| Inv-35 | 3.94% | 96.06% | 575 nm | 73 $\mu m^{-1}$ ± 1 $\mu m^{-1}$ |
| Inv-36 | 3.98% | 96.02% | 573 nm | 72 $\mu m^{-1}$ ± 1 $\mu m^{-1}$ |
| Inv-37 | 4.72% | 95.28% | 568 nm | 61 $\mu m^{-1}$ ± 1 $\mu m^{-1}$ |
| Inv-38 | 4.94% | 95.06% | 570 nm | 58 $\mu m^{-1}$ ± 1 $\mu m^{-1}$ |
| Inv-39 | 8.69% | 91.31% | 570 nm | 33 $\mu m^{-1}$ ± 1 $\mu m^{-1}$ |

The electro-optical properties are measured. For this measurement, a 300 W Xenon Arc Lamp is used. The light source emits light into a monochromator that separates the emitted light into a single wavelength of light. The cell is positioned normal to the light beam. The photodetector is already positioned so that if the sample is placed perpendicular to the light beam, the photodetector captures the reflection of the sample at an angle of 45°. Once the cell is aligned, using a LabVIEW program to control the equipment remotely, the spectrum is measured to determine maximum reflection of the cell at 45°. The setup is then set the peak wavelength for the remaining measurements. Next, the response time for the cell to relax from the homeotropic state to the planar texture is measured. Then, the electro-optical response curve is measured, where the program sweeps through range of voltages measuring the reflectance at each voltage. For these measurements, a pulse-width of 100 ms at a frequency of 250 Hz is used.

Figure 2:
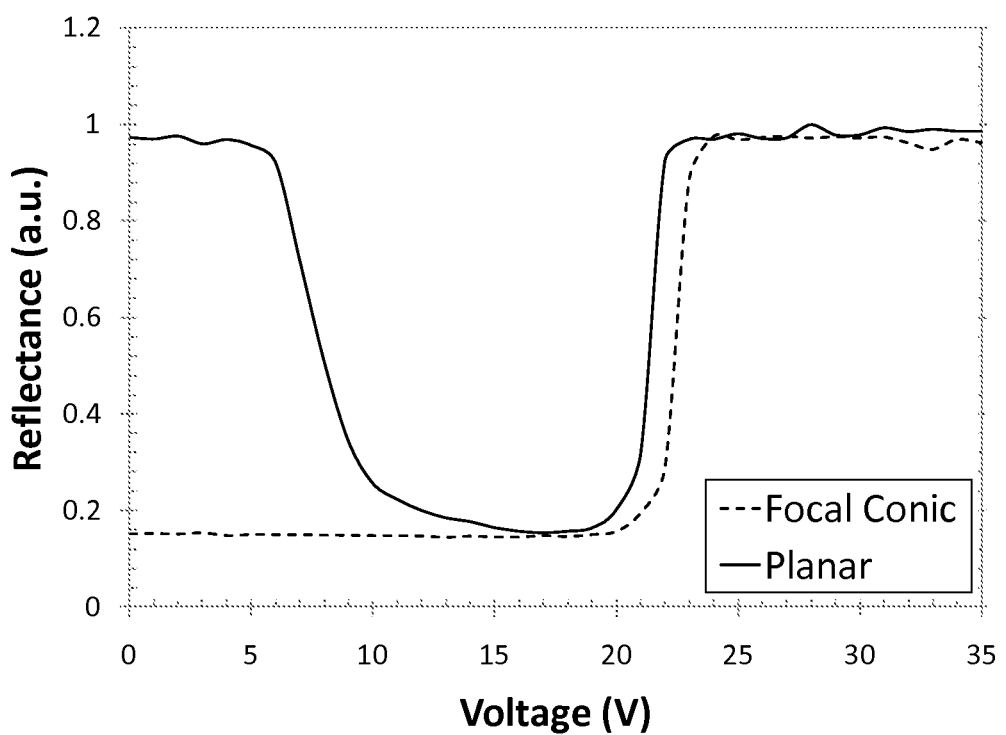
FIG. 2: Electro-optical response for Inv-2 in LC 1 at a pulsewidth of 100 ms at 250 Hz.
Figure 3:
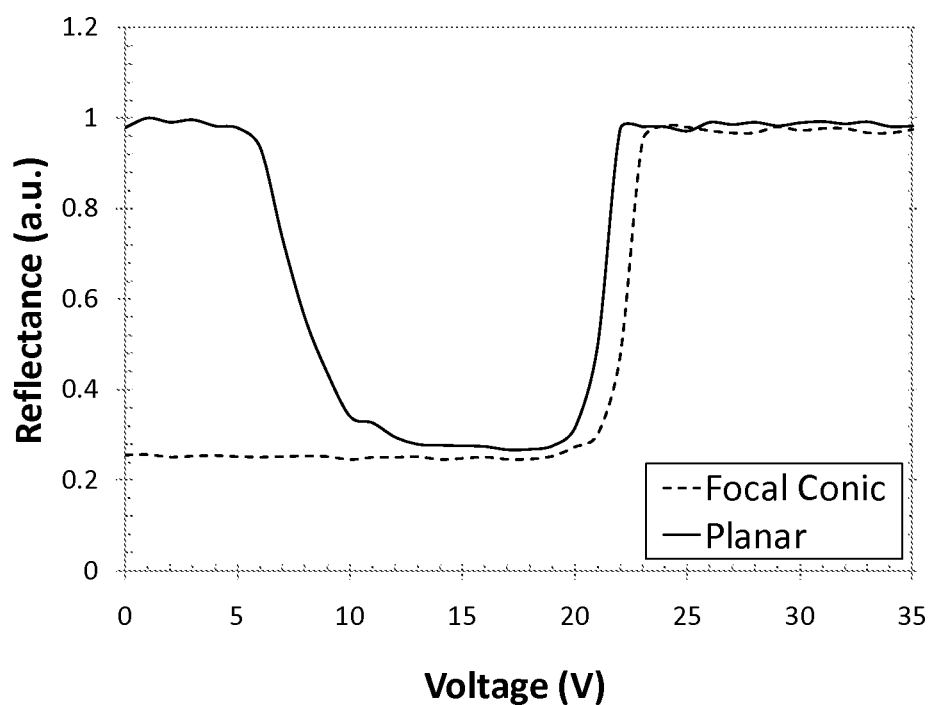
FIG. 3: Electro-optical response for Inv-3 in LC 1 at a pulsewidth of 100 ms at 250 Hz.

The electro-optical response curve is shown in FIGS. 1-3. Regarding FIG. 1, the electro-optical response behaves accordingly to LC1 indicating Inv-1 does not affect the electro-optical properties of the nematic liquid crystal. Regarding FIG. 2, the electro-optical response behaves accordingly to LC1 indicating Inv-2 does not affect the electro-optical properties of the nematic liquid crystal. Regarding FIG. 3, the electro-optical response behaves accordingly to LC1 indicating Inv-3 does not affect the electro-optical properties of the nematic liquid crystal.

Many modifications and variations of the invention will be apparent to those of ordinary skill in the art in light of the foregoing disclosure. Therefore, it is to be understood that, within the scope of the appended claims, the invention can be practiced otherwise than has been specifically shown and described.

What is claimed is:

1. A liquid crystal composition comprising a chiral dopant compound represented by the following formula:

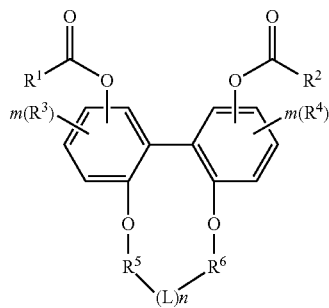

wherein:
R$^1$, R$^2$ are independently aryl, alkyl, alkenyl, cycloalkyl, alkoxyaryl, alkaryl or heterocyclic all either substituted or unsubstituted, or combine to form a carbocyclic or heterocyclic ring;
R$^3$ and R$^4$ are independently hydrogen, halogen, cyano, alkoxy, NHCOR$^7$, NHSO$_2$R$^7$, COOR$^7$, OCOR$^7$, aryl, alkyl, alkenyl, cycloalkyl, alkoxyaryl, alkaryl or heterocyclic all either substituted or unsubstituted, or combine with either R$^1$ or R$^2$ to form a carbocylic or heterocyclic ring;
R$^5$ and R$^6$ are independently hydrogen, CH$_2$, CH, alkyl or aryl either substituted or unsubstituted, COOR$^7$, or combine with L to form a carbocyclic or heterocyclic ring;
R$^7$ is aryl, alkyl, alkenyl, cycloalkyl, alkoxyaryl or heterocyclic all either substituted or unsubstituted;
L is the non-metallic elements required to form a carbocyclic or heterocyclic ring, or a single bond or a double bond;
m is 1-3;
n is 1-12.

2. A liquid crystal composition of claim 1 comprising an enantiomerically excess of one enantiomer of said chiral dopant compound.

3. A liquid crystal composition of claim 1 wherein R1 and R2 are aryl either substituted or unsubstituted as defined by: —R$^1$ or —R$^2$=—(Y—K)$_p$—Z: wherein K is a single bond or double bond or bivalent linking selected from the group consisting of: —C(=O)O—; —O(C=O)—; —CH$_2$CH$_2$—; —CH=CH—; —C≡C—; —OCH$_2$—; —CH$_2$O—; —N=CH—; —CH=N—; —O(C=O)O—; —C≡C—C≡C—; —COCH=CH—; —CH=CHCO—; —O—; —S—; and SO$_2$; as long as oxygen atoms are not linked directly to one another; wherein Y and Z independently are optionally selected from the group consisting of: 1,4-phenylene in which, in addition, one or more methylene may be replaced by —N=; 1,4-cyclohexyl in which, in addition, one or more non-adjacent methylene units may be replaced by O or S; 1,4-cyclohexylene; 1,4-bicyclo[2.2.2]octylene; piperidine-1,4-diyl; decahydronaphthalene-1,6-diyl; and 1,2,3,4-tetrahydronaphthalene-1,6-diyl; wherein each of the Y or Z groups may be unsubstituted or mono-substituted or poly-substituted with halogen, cyano, isocyanato, or nitro groups, or alkyl, alkoxyl, or alkanoyl groups bearing 1-12 carbons where one or more hydrogens may be replaced with chlorine or fluorine and wherein p=0, 1, 2, 3, 4.

4. A liquid crystal composition of claim 1 wherein R$^5$ and R$^6$ are a methylene group and a substituted methine group.

5. A liquid crystal composition of claim 1 comprising said chiral dopant admixed with a liquid crystal material, wherein said chiral dopant compound is optionally in a polymerized form.

6. A liquid crystal composition of claim 5 further comprising a polymer binder in which domains of the liquid crystal material are dispersed.

7. A liquid crystal composition of claim 5 further comprising at least one of a catalyst, a sensitizer, a stabilizer, a co-reacting monomer, or a surface-active compound.

8. A liquid crystal composition of claim 5 which is STN, TN, chiral nematic, or ferroelectric.

9. A liquid crystal composition of claim 5 which is chiral nematic.

10. A liquid crystal display, optical element, or color filter comprising the liquid crystal composition of claim 5.

11. The display of claim 10 wherein the display is selected from the group consisting of a STN, TN, AMD-TN, temperature compensation, guest-host, phase change, polymer free cholesteric texture, and polymer stabilized cholesteric texture display.

12. A liquid crystal composition comprising a chiral dopant compound represented by the following formula:

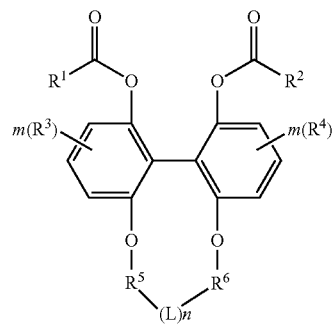

wherein:
R[1], R[2] are independently aryl, alkyl, alkenyl, cycloalkyl, alkoxyaryl, alkaryl or heterocyclic all either substituted or unsubstituted, or combine to form a carbocyclic or heterocyclic ring;
R[3] and R[4] are independently hydrogen, halogen, cyano, alkoxy, NHCOR[7], NHSO$_2$R[7], COOR[7], OCOR[7], aryl, alkyl, alkenyl, cycloalkyl, alkoxyaryl, alkaryl or heterocyclic all either substituted or unsubstituted, or combine with either R[1] or R[2] to form a carbocylic or heterocyclic ring;
R[5] and R[6] are independently hydrogen, CH$_2$, CH, alkyl or aryl either substituted or unsubstituted, COOR[7], or combine with L to form a carbocyclic or heterocyclic ring;
R[7] is aryl, alkyl, alkenyl, cycloalkyl, alkoxyaryl or heterocyclic all either substituted or unsubstituted;
L is the non-metallic elements required to form a carbocyclic or heterocyclic ring, or a single bond or a double bond;
m is 1-3;
n is 1-12.

13. A liquid crystal composition of claim 12 comprising an enantiomerically excess of one enantiomer of said chiral dopant compound.

14. A liquid crystal composition of claim 12 wherein R[1] and R[2] are aryl either substituted or unsubstituted as defined by: —R[1] or —R[2]=—(Y—K)$_p$—Z: wherein K is a single bond or double bond or bivalent linking selected from the group consisting of: —C(=O)O—; —O(C=O)—; —CH$_2$CH$_2$—; —CH=CH—; —C≡C—; —OCH$_2$—; —CH$_2$O—; —N=CH—; —CH=N—; —O(C=O)O—; —C≡C—C≡C—; —COCH=CH—; —CH=CHCO—; —O—; —S—; and SO2; as long as oxygen atoms are not linked directly to one another; wherein Y and Z independently are optionally selected from the group consisting of: 1,4-phenylene in which, in addition, one or more methylene may be replaced by —N=; 1,4-cyclohexyl in which, in addition, one or more non-adjacent methylene units may be replaced by O or S; 1,4-cyclohexylene; 1,4-bicyclo[2.2.2]octylene; piperidine-1,4-diyl; decahydronaphthalene-1,6-diyl; 1,2,3,4-tetrahydronaphthalene-1,6-diyl; wherein each of the Y or Z groups may be unsubstituted or mono-substituted or poly-substituted with halogen, cyano, isocyanato, or nitro groups, or alkyl, alkoxyl, or alkanoyl groups bearing 1-12 carbons where one or more hydrogens may be replaced with chlorine or fluorine and wherein p=0, 1, 2, 3,4.

15. A liquid crystal composition of claim 12 wherein R[5] and R[6] are a methylene group and a substituted methine group.

16. A liquid crystal composition of claim 12 comprising said chiral dopant admixed with a liquid crystal material, wherein said chiral dopant compound is optionally in a polymerized form.

17. A liquid crystal composition of claim 16 further comprising a polymer binder in which domains of the liquid crystal material are dispersed.

18. A liquid crystal composition of claim 16 further comprising at least one of a catalyst, a sensitizer, a stabilizer, a co-reacting monomer, or a surface-active compound.

19. A liquid crystal composition of claim 16 which is STN, TN, chiral nematic, or ferroelectric.

20. A liquid crystalline composition of claim 16 which is chiral nematic.

21. A liquid crystal display, optical element, or color filter comprising the liquid crystal composition of claim 16.

22. The display of claim 21 wherein the display is selected from the group consisting of a STN, TN, AMD-TN, temperature compensation, guest-host, phase change, polymer free cholesteric texture, and polymer stabilized cholesteric texture display.

23. A liquid crystal composition comprising a chiral dopant compound represented by the following formula:

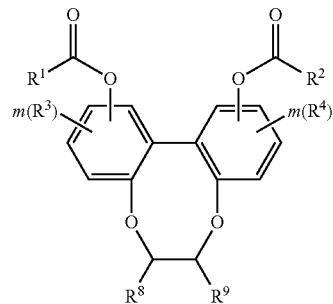

wherein:
R[1], R[2] are independently aryl, alkyl, alkenyl, cycloalkyl, alkoxyaryl, alkaryl or heterocyclic all either substituted or unsubstituted, or combine to form a carbocyclic or heterocyclic ring;
R[3] and R[4] are independently hydrogen, halogen, cyano, alkoxy, NHCOR[7], NHSO$_2$R[7], COOR[7], OCOR[7], aryl, alkyl, alkenyl, cycloalkyl, alkoxyaryl, alkaryl or heterocyclic all either substituted or unsubstituted, or combine with either R[1] or R[2] to form a carbocylic or heterocyclic ring;
R[8] and R[9] are independently hydrogen, CH$_2$, CH, alkyl or aryl either substituted or unsubstituted, COOR[7], or combine to form a carbocyclic or heterocyclic ring;
R[7] is aryl, alkyl, alkenyl, cycloalkyl, alkoxyaryl or heterocyclic all either substituted or unsubstituted;
m is 1-3.

24. A liquid crystal composition of claim 23 comprising an enantiomerically excess of one enantiomer of said chiral dopant compound.

25. A liquid crystal composition of claim 23 wherein R[1] and R[2] are aryl either substituted or unsubstituted as defined by: —R[1] or —R[2]=—(Y—K)$_p$—Z: wherein K is a single bond or double bond or bivalent linking selected from the group consisting of: —C(=O)O—; —O(C=O)—; —CH$_2$CH$_2$—; —CH=CH—; —C≡C—; —OCH$_2$—; —CH$_2$O—; —N=CH—; —CH=N—; —O(C=O)O—; —C≡C—C≡C—; —COCH=CH—; —CH=CHCO—; —O—; —S—; and SO$_2$; as long as oxygen atoms are not linked directly to one another; wherein Y and Z independently are optionally selected from the group consisting of: 1,4-phenylene in which, in addition, one or more methylene may be replaced by —N=; 1,4-cyclohexyl in which, in addition, one or more non-adjacent methylene units may be replaced by O or S; 1,4-cyclohexylene; 1,4-bicyclo[2.2.2]octylene; piperidine-1,4-diyl; decahydronaphthalene-1,6-diyl; 1,2,3,4-tetrahydronaphthalene-1,6-diyl; wherein each of the Y or Z groups may be unsubstituted or mono-substituted or poly-substituted with halogen, cyano, isocyanato, or nitro groups, or alkyl, alkoxyl, or alkanoyl groups bearing 1-12 carbons where one or more hydrogens may be replaced with chlorine or fluorine and wherein p=0, 1, 2, 3, 4.

26. A liquid crystal composition of claim 23 comprising said chiral dopant compound admixed with a liquid crystal material, said chiral dopant compound being optionally in a polymerized form.

27. A liquid crystal composition of claim 26 further comprising a polymer binder in which domains of the liquid crystal material are dispersed.

28. A liquid crystal composition of claim 26 further comprising at least one of a catalyst, a sensitizer, a stabilizer, a co-reacting monomer, or a surface-active compound.

29. A liquid crystal composition of claim 26 which is STN, TN, chiral nematic, or ferroelectric.

30. A liquid crystal composition of claim 26 which is chiral nematic.

31. A liquid crystal display, optical element, or color filter comprising said chiral dopant compound of claim 26.

32. The display of claim 31 wherein the display is selected from the group consisting of a STN, TN, AMD-TN, temperature compensation, guest-host, phase change, polymer free cholesteric texture, and polymer stabilized cholesteric texture display.

33. A liquid crystal composition comprising a chiral dopant compound represented by the following formula:

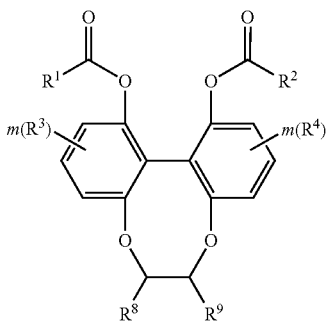

wherein:

$R^1$, $R^2$ are independently aryl, alkyl, alkenyl, cycloalkyl, alkoxyaryl, alkaryl or heterocyclic all either substituted or unsubstituted, or combine to form a carbocyclic or heterocyclic ring;

$R^3$ and $R^4$ are independently hydrogen, halogen, cyano, alkoxy, $NHCOR^7$, $NHSO_2R^7$, $COOR^7$, $OCOR^7$, aryl, alkyl, alkenyl, cycloalkyl, alkoxyaryl, alkaryl or heterocyclic all either substituted or unsubstituted, or combine with either $R^1$ or $R^2$ to form a carbocyclic or heterocyclic ring; $R^8$ and $R^9$ are independently hydrogen, $CH_2$, CH, alkyl or aryl either substituted or unsubstituted, $COOR^7$, or combine to form a carbocyclic or heterocyclic ring;

$R^7$ is aryl, alkyl, alkenyl, cycloalkyl, alkoxyaryl or heterocyclic all either substituted or unsubstituted;

m is 1-3.

34. A liquid crystal composition of claim 33 comprising said chiral dopant compound admixed with a liquid crystal material, said chiral dopant compound optionally being in a polymerized form.

35. A liquid crystal composition comprising a chiral dopant compound represented by the following formula:

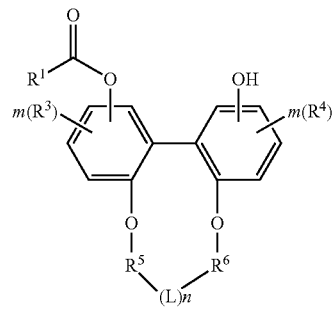

wherein:

R1 is independently aryl, alkyl, alkenyl, cycloalkyl, alkoxyaryl, alkaryl or heterocyclic all either substituted or unsubstituted, or combine to form a carbocyclic or heterocyclic ring;

R3 and R4 are independently hydrogen, halogen, cyano, alkoxy, NHCOR7, NHSO2R7, COOR7, OCOR7, aryl, alkyl, alkenyl, cycloalkyl, alkoxyaryl, alkaryl or heterocyclic all either substituted or unsubstituted, or combine with either R1 or OH to form a carbocyclic or heterocyclic ring;

R5 and R6 are independently hydrogen, CH2, CH, alkyl or aryl either substituted or unsubstituted, COOR7, or combine with L to form a carbocyclic or heterocyclic ring;

R7 is aryl, alkyl, alkenyl, cycloalkyl, alkoxyaryl or heterocyclic all either substituted or unsubstituted;

L is the non-metallic elements required to form a carbocyclic or heterocyclic ring, or a single bond or a double bond;

m is 1-3;

n is 1-12.

36. A liquid crystal composition of claim 35 comprising said chiral dopant compound admixed with a liquid crystal material, said chiral dopant compound optionally being in a polymerized form.

37. A liquid crystal composition comprising a chiral dopant compound represented by the following formula:

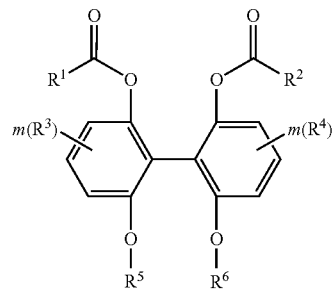

wherein:

R1, R2 are independently aryl, alkyl, alkenyl, cycloalkyl, alkoxyaryl, alkaryl or heterocyclic all either substituted or unsubstituted, or combine to form a carbocyclic or heterocyclic ring;

R3 and R4 are independently hydrogen, halogen, cyano, alkoxy, NHCOR7, NHSO2R7, COOR7, OCOR7, aryl, alkyl, alkenyl, cycloalkyl, alkoxyaryl, alkaryl or heterocyclic all either substituted or unsubstituted, or combine with either R1 or R2 to form a carbocylic or heterocyclic ring;

R5 and R6 are independently hydrogen, CH2, CH, alkyl or aryl either substituted or unsubstituted, or COOR7;

R7 is aryl, alkyl, alkenyl, cycloalkyl, alkoxyaryl or heterocyclic all either substituted or unsubstituted;

m is 1-3.

* * * * *

UNITED STATES PATENT AND TRADEMARK OFFICE
CERTIFICATE OF CORRECTION

PATENT NO. : 8,691,111 B2
APPLICATION NO. : 13/456622
DATED : April 8, 2014
INVENTOR(S) : Donald Diehl et al.

It is certified that error appears in the above-identified patent and that said Letters Patent is hereby corrected as shown below:

On the Title Page, item (73) in the patent details, "Assignee," please delete "Kent Displays Inc." and insert -- Kent Displays Inc.; Kent State University --

In the Specification

Column 34, lines 13-14; please delete the words "mL of tetrahydrofuran" and replace them with "15 mL of tetrahydrofuran"

Signed and Sealed this
First Day of July, 2014

Michelle K. Lee
*Deputy Director of the United States Patent and Trademark Office*